(12) United States Patent
Amato

(10) Patent No.: US 9,197,408 B2
(45) Date of Patent: Nov. 24, 2015

(54) SYSTEMS AND METHODS FOR PROVIDING A SECURE DATA EXCHANGE

(71) Applicant: Riccardo Franco Amato, Sandhausen (DE)

(72) Inventor: Riccardo Franco Amato, Sandhausen (DE)

(73) Assignee: SAP SE, Walldorf (DE)

( * ) Notice: Subject to any disclaimer, the term of this patent is extended or adjusted under 35 U.S.C. 154(b) by 194 days.

(21) Appl. No.: 13/892,030

(22) Filed: May 10, 2013

(65) Prior Publication Data

US 2014/0337628 A1  Nov. 13, 2014

(51) Int. Cl.
*H04L 9/08* (2006.01)
*H04L 29/06* (2006.01)

(52) U.S. Cl.
CPC ............ *H04L 9/0825* (2013.01); *H04L 9/0894* (2013.01); *H04L 63/0442* (2013.01)

(58) Field of Classification Search
None
See application file for complete search history.

(56) References Cited

U.S. PATENT DOCUMENTS

| | | | |
|---|---|---|---|
| 6,173,400 B1 | 1/2001 | Perlman et al. | |
| 6,178,511 B1 | 1/2001 | Cohen et al. | |
| 6,243,816 B1 | 6/2001 | Fang et al. | |
| 7,370,347 B2 | 5/2008 | Ullrich | |
| 7,500,262 B1 | 3/2009 | Sanin et al. | |
| 8,316,422 B2 | 11/2012 | Hofmann et al. | |
| 8,615,794 B1 | 12/2013 | Tomilson et al. | |
| 8,635,684 B2 | 1/2014 | Thun | |
| 2003/0182551 A1 | 9/2003 | Frantz et al. | |
| 2004/0008846 A1* | 1/2004 | Medvinsky | 380/278 |
| 2005/0154913 A1 | 7/2005 | Barriga et al. | |
| 2006/0123476 A1* | 6/2006 | Yaghmour | 726/22 |
| 2009/0210709 A1* | 8/2009 | Fujiwara et al. | 713/171 |
| 2009/0296937 A1* | 12/2009 | Suu | G06F 21/6209 380/277 |
| 2011/0320359 A1* | 12/2011 | Li et al. | 705/71 |
| 2012/0130902 A1* | 5/2012 | Dingler et al. | 705/71 |
| 2012/0191977 A1* | 7/2012 | Foster | H04L 9/3242 713/170 |
| 2012/0266228 A1 | 10/2012 | Dash et al. | |
| 2012/0290833 A1 | 11/2012 | Clegg et al. | |
| 2013/0086669 A1 | 4/2013 | Sondhi et al. | |
| 2013/0125226 A1 | 5/2013 | Shah et al. | |
| 2014/0052989 A1* | 2/2014 | Jones et al. | 713/171 |
| 2014/0082715 A1 | 3/2014 | Grajek et al. | |

* cited by examiner

*Primary Examiner* — Benjamin Lanier
*Assistant Examiner* — Malcolm Cribbs
(74) *Attorney, Agent, or Firm* — Mintz Levin Cohn Ferris Glovsky and Popeo, P.C.

(57) ABSTRACT

A system, a method, and a computer program product for a data exchange are provided. A first application generates a first key for exchange of data between the first application and a second application. The first application stores the first key in a first memory location. The second application obtains the first key from the memory location. The second application generates a second key for exchange of data between the first application and the second application. The second application creates a data request that contains the second key and is encrypted using the first key. The encrypted request is provided to the first application. The first application provides the data identified in the data request to the second application. The data is encrypted by the first application using the second key prior to being provided to the second application. The second application decrypts the data using the second key.

17 Claims, 16 Drawing Sheets

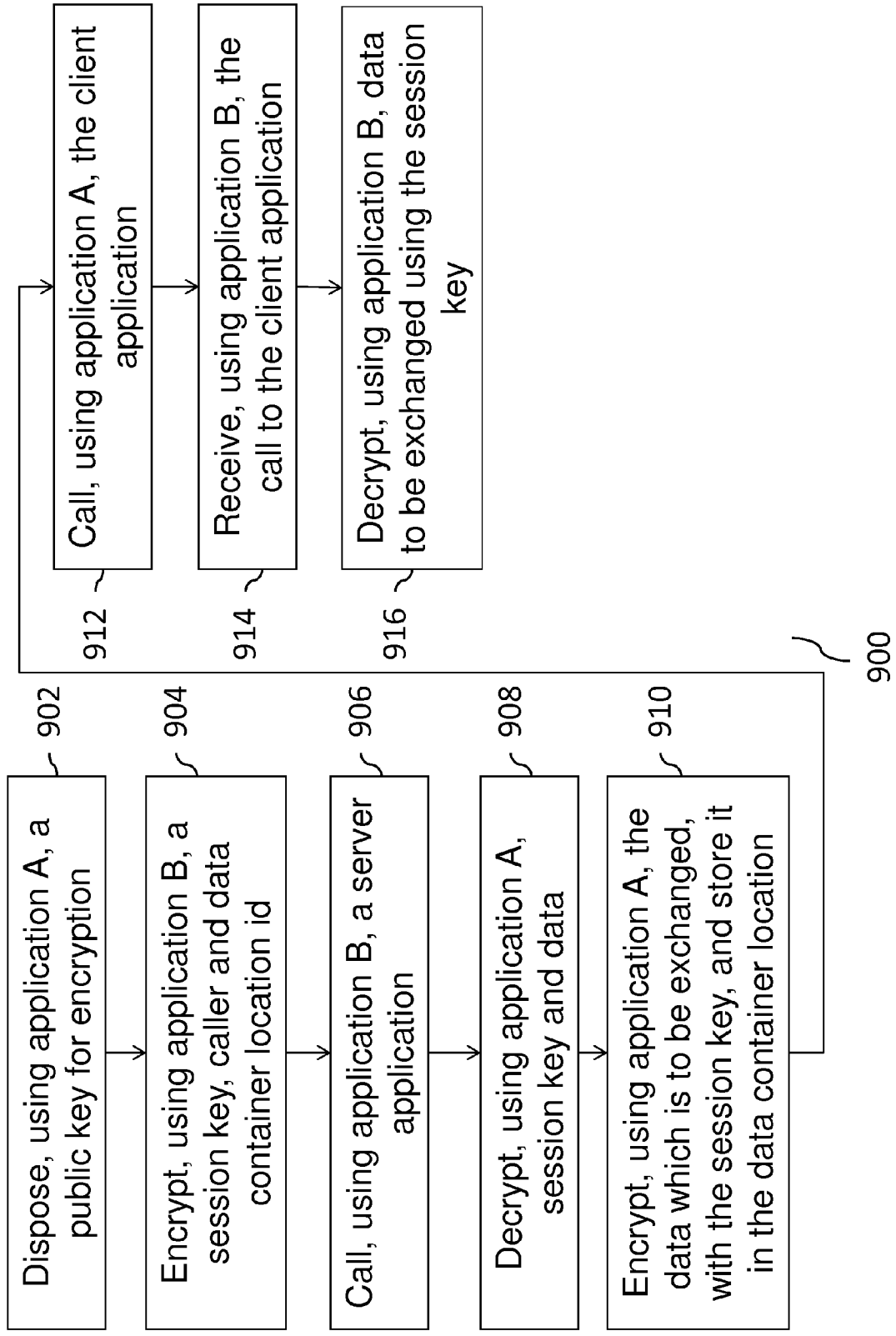

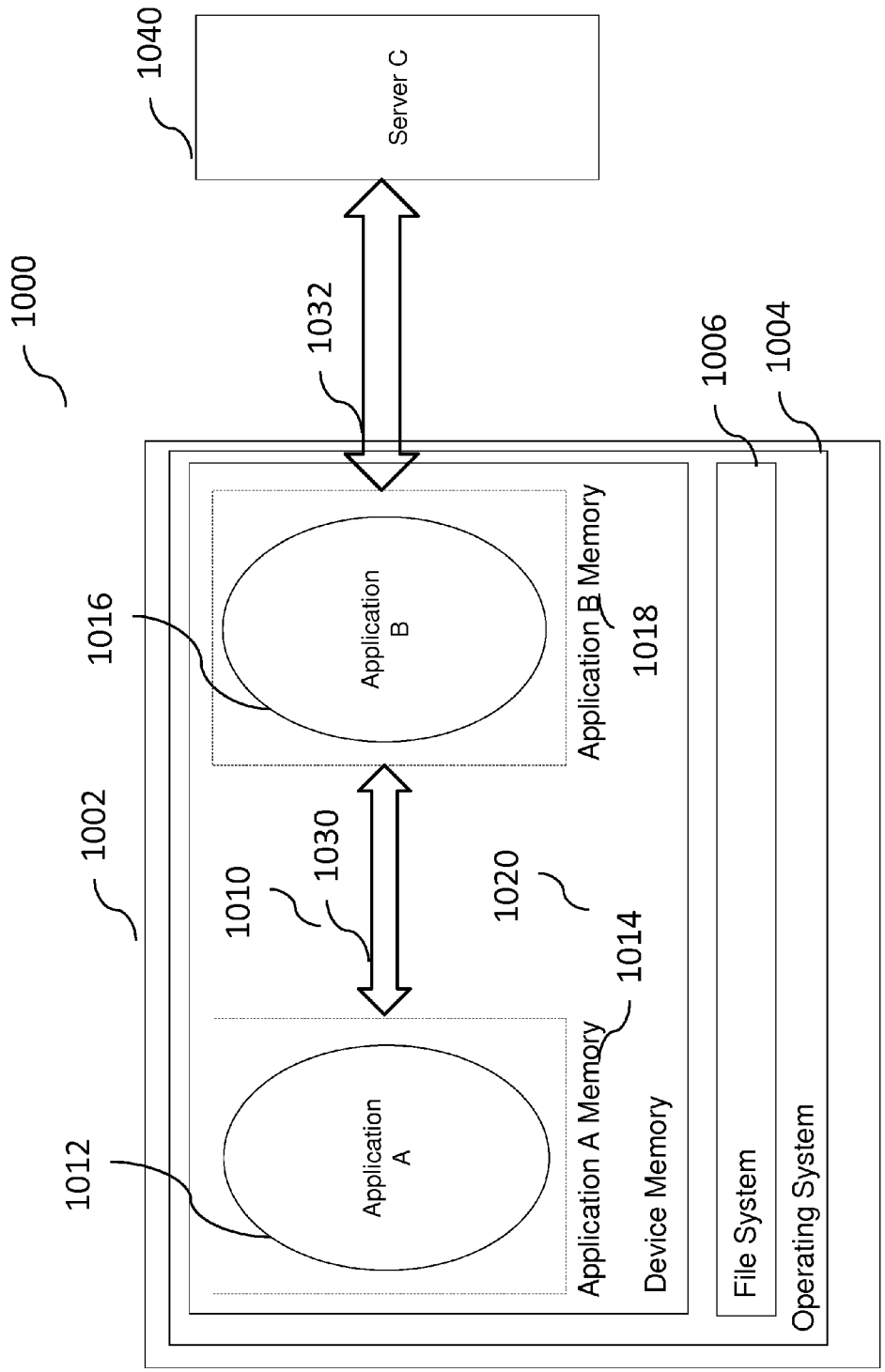

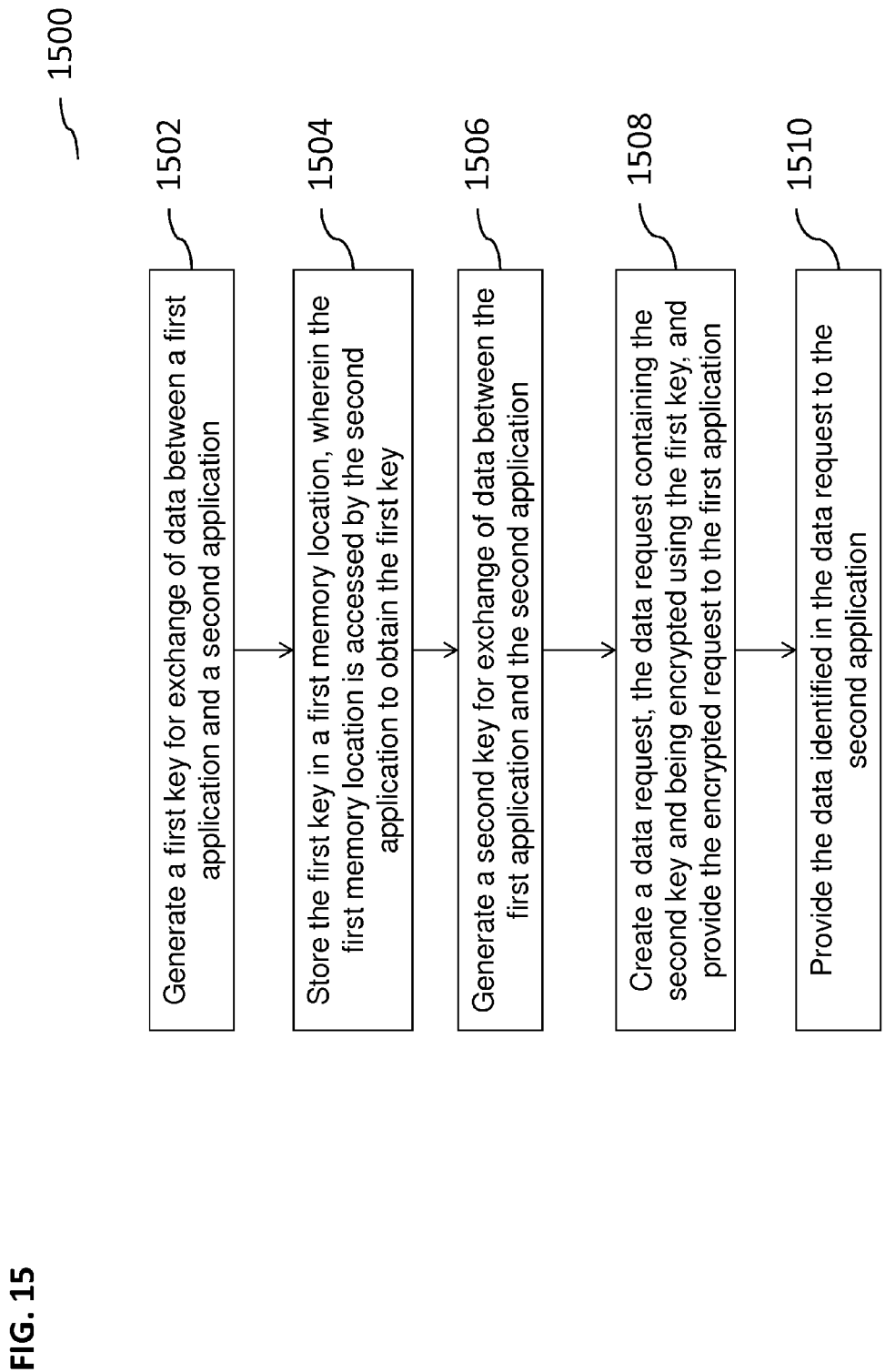

SYSTEMS AND METHODS FOR PROVIDING A SECURE DATA EXCHANGE

TECHNICAL FIELD

This disclosure relates generally to data processing and, in particular, to a data exchange between applications.

BACKGROUND

Businesses implement a plurality of business processes to support their operations. Such business processes can be software applications that can be developed by businesses or purchased by business from a variety of vendors. The applications can be installed on networks, servers, personal computers, mobile devices, and/or other computing systems that are used by businesses to perform its operations. Applications can receive and process data, communicate with computing systems' components, such as servers, computers, other applications, etc., output reports, as well as perform various other functions. Such communications are typically secure communication to provide secure data exchange as well as prevent data and technology loss and/or theft.

Some applications implement usage of keychains that can store passwords, keys, certificates (e.g., X.509), and/or identities (e.g., a key and an associated certificate). Some keychains can be unique to specific applications, e.g., private keychains, while others can be shared by applications. Applications that are based on the application keychains are built using provisioning profiles. Provisioning profiles are also used to distribute applications through online stores as well as install applications on various devices. Provisioning profiles are typically represented by signed X.509 certificates that can be issued for a company that designed a particular application and can be part of a code-signing process. Such certificates have a limited validity period and after expiration, a new provisioning profile must be created, which can be accomplished by using a certificate request and the creation of a new provisioning profile. If the certificates associated with a particular application are not valid or do not cover all relevant applications with their associated identifiers, the application cannot be accessed or used.

SUMMARY

In some implementations, the current subject matter relates to a computer-implemented method for data exchange. The method can include generating, using a first application, a first key for exchange of data between the first application and a second application, storing, using the first application, the first key in a first memory location, wherein the first memory location is accessed by the second application to obtain the first key, generating, using the second application, a second key for exchange of data between the first application and the second application, creating, using the second application, a data request, the data request containing the second key and being encrypted using the first key, and providing the encrypted request to the first application, and providing, using the first application, the data identified in the data request to the second application, wherein the data is encrypted by the first application using the second key prior to being provided to the second application and the second application decrypts the data using the second key. At least one of the generating the first key, storing, the generating the second key, the creating and the providing can be performed on at least one processor.

In some implementations, the current subject matter can include one or more of the following optional features. The first key is a first public encryption key. The first application can decrypt the data request using the first private decryption key. The first application can store the encrypted data created in response to the data request in a second memory location. The second memory location can be created by the second application for exchanging data with the first application. The data request can include an identification information of the second memory location.

In some implementations, the first application can provide the encrypted data created in response to the data request directly to the second application.

The second key can be a session key generated by the second application for requesting data from the first application. In some implementations, the second key can be a second public encryption key. The second application can decrypt the data using a second private decryption key. The method can further include storing, using the first application, the first public encryption key in the first memory location, and storing, using the second application, a second public encryption key in a second memory location. The second memory location can be accessed by the first application to obtain the second public encryption key. The method can also include creating, using the second application, a third memory location accessible by the first application and the second application, storing, using the first application, data created in response to the data request, the data being encrypted using the second public encryption key and stored in the third memory location, obtaining, using the second application, the encrypted data from the third memory location and decrypting the obtained data using the second private decryption key, and deleting, using the second application, the third memory location. Further, the method can include providing, using the first application, the data created in response to the data request directly to the second application, wherein the data being encrypted by the first application using the second public encryption key and, upon receipt by the second application from the first application, being decrypted by the second application using second private decryption key.

In some implementations, the method can include deleting, using the first or second application, the first key from the first memory location.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 illustrates another exemplary process for secure data exchange between two applications, according to some implementations of the current subject matter;

FIG. 10 illustrates an exemplary system that shows functionalities of the certificate manager shown in FIG. 3 and various authentication components, according to some implementations of the current subject matter;

FIG. 15 illustrates an exemplary method, according to some implementations of the current subject matter.

DETAILED DESCRIPTION

Figure 1:
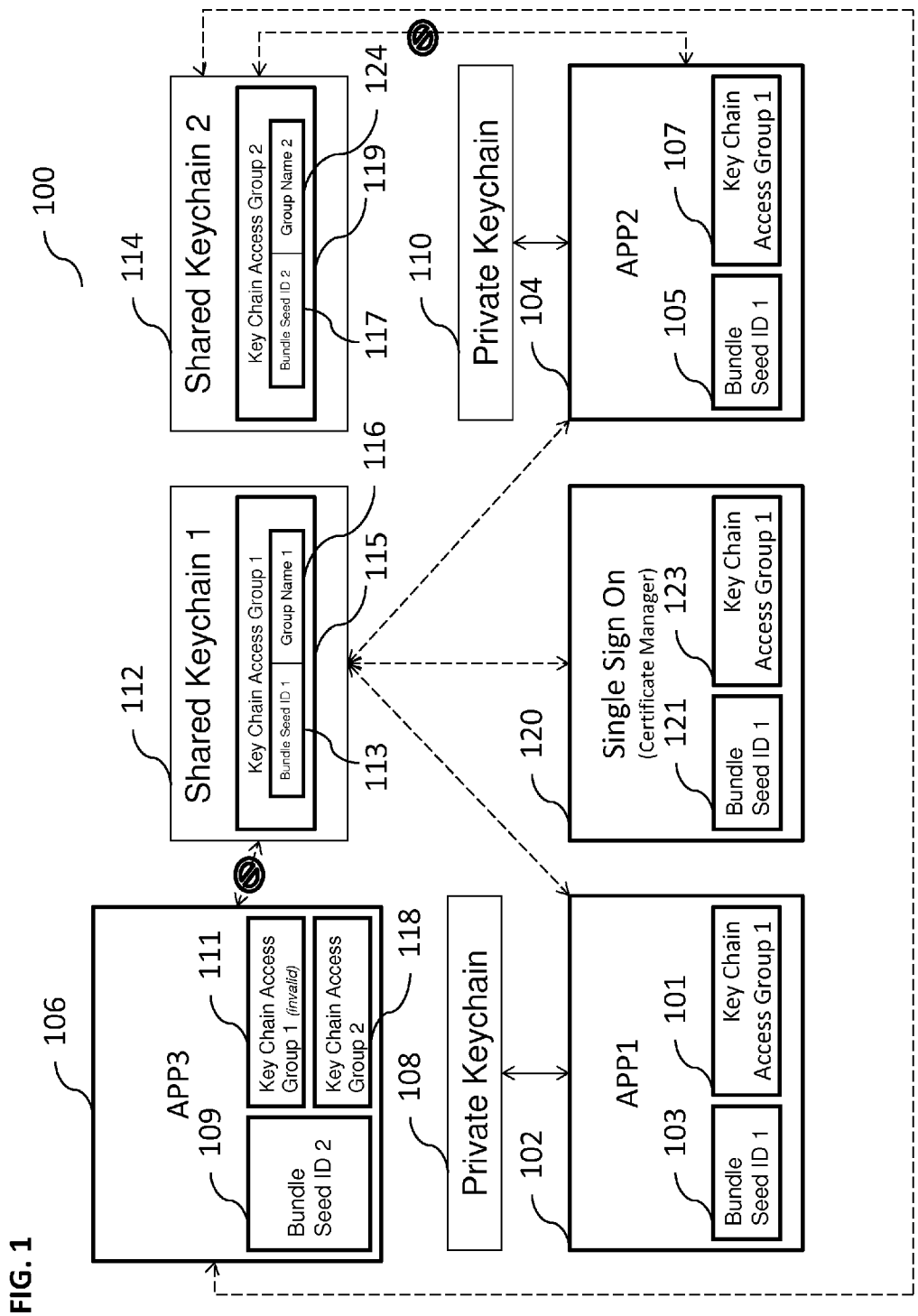
FIG. 1 illustrates an exemplary system for providing a communication between applications.

To address the above-noted and potentially other deficiencies of currently available solutions, one or more implementations of the current subject matter provide methods, systems, articles or manufacture, and the like that can, among other possible advantages, provide systems and methods for providing systems, methods, and computer program products for a secure data exchange between applications.

Further, re-building and re-distribution of applications can be necessary. Applications that access a shared keychain may need to be rebuilt (e.g., if access to the shared keychain is not possible anymore) in case of a bundle seed ID change (e.g. a provisioning team change, because this can cause an invalid entitlement) or a new application with a different bundle seed ID in the application identifier should be added to the shared keychain accessing applications. Similar issues can appear if a new/modified keychain access group should be added or a keychain access group should be removed, which can cause necessary dependent application source changes, to the shared keychain accessing applications. These circumstances can cause a significant time delay and resource effort as well as a potential profit loss from an inability to use such applications. Only applications provisioned with valid entitlement can use the technique of the shared keychain. Other applications, e.g., from other companies using different provisioning profiles (e.g., because of different bundle seed ID/team ID of the application identifier), do not have the possibility to access the shared keychain of applications from another software vendor and thus, cannot be incorporated into shared keychain based application scenarios and processes of the software vendor. Even if shared keychain use is restricted, due to the dependency of the provisioning profile and the covered application IDs, in general to the applications owned by the company, they do not support any control about data access and data manipulations of the keychain data. Any entitled application can change (read/create/modify/delete) at any time (if the keychain is not locked). This can endanger business processes if an application may be of sensitive nature, which another application still wants to access. Similarly, an undesired modification of data (if not recognized) can cause wrong processed data or other unexpected results, e.g., failed authentication. There are also possible security risks, because of the unavailable access control, which can be used by other applications to steal or manipulate sensitive keychain data, i.e., the identity of a user or a certificate or any other kind of data.

In some implementations, the current subject matter relates to a system and a method for providing a secure data exchange between applications. Such exchange can involve providing certificates and identities from an application A (e.g., a server) to an application B (e.g., a client application). The current subject can enable exchange of certificates/identities with or without use of a shared keychain. The current subject matter can implement a single sign-on access process to provide connection and authentication for the purposes of secure data exchange between applications and servers. It can also support client-authenticated transport layer security (TLS) functionality. The current subject matter system can be used to exchange any type of data which can depend on an access-able device storage and/or access-able device memory, and hence, the current subject matter is not restricted to the use of certificates.

FIG. 1 illustrates an exemplary system 100 for providing authenticated and secure communication between applications with a restricted data access policy, which can involve a data exchange using shared keychains. This policy can be provided by an operating system, in this case based on the application-layer, restricting some applications in accessing the keychains. The system 100 can include an application APP1 102, an application APP2 104, and an application APP3 106, a single sign-on component 120, which can be also referred to as a certificate/identity manager, which can be also an application, and a collection of shared keychains 112 and 114. The keychains can be in different areas, each of them can be independent from each other, also from a storage perspective. Applications 102-106 and 120 can run on various devices, including mobile devices. Applications running on a device can use a private (application-specific) keychain and can also use a shared (or public) keychain to run and/or access various components and/or other applications, which can be installed on any kind of (business) server. Further, applications 102-106 and 120 can use private keychains and shared keychains for the purpose of enabling authenticated communications between applications and other components of various devices. The keychains (private or shared) can contain at least one of the following: a password (for a specific user), a key, a certificate (e.g., X.509), identity information, and/or any other information, and/or any combination of such information or similar data. Besides other existing keychain services, such as key generation for the purpose of encryption and decryption, the keychain data can be used as credentials to log in and/or authenticate against different (business/backend) server systems, to establish a valid connection, and consume any kind of service and/or access data and/or execute any kind of request/response processing with a specific user for which a valid credential (e.g., password, identity, certificate etc.), represented by a keychain item, is existing in the keychain. For example, APP1 102 can use a private keychain 108 and APP2 104 can use a private keychain 110 to provide credentials for such a connection. Applications cannot use keychain items of other applications' private keychains. In some implementations, applications can share a keychain that is outside of the application by using an identical keychain access group 1 (shown as group 101 for APP1, group 107 for APP2, group 111 for APP3; groups 101, 107, and 111 are the same keychain access group 1). Applications can access and use keychain items of their private and shared keychains, which can include the following operations: create/read/update/delete keychain items.

FIG. 1 illustrates shared keychains 112 and 114, with their identifying keychain access groups 115 for keychain 112 and 119 for keychain 114. Keychain access groups can consist out of 2 parts which can be delimited by a dot: the bundle seed ID, e.g., a ten-character string (e.g., "384ACF5980"), which sometimes can be referred to as a "team ID", (shown as bundle seed ID 113 for keychain access group 115, bundle seed ID 117 for keychain access group 119) and the group name (shown as group name 116 for keychain access group 115; group name 124 for keychain access group 119), e.g., a reversed domain name string (e.g., "com.company.keychaingroup1"). The concrete keychain access group of the explained example can be "384ACF5980.com.company.keychaingroup1". Some keychain access groups can have identical bundle seed IDs, while others have different bundle seed IDs. The bundle seed IDs steer the usage of the keychain access groups. All applications with the same bundle seed ID can use a keychain access group which have the same bundle seed ID, and can therefore access the referred keychains. The application bundle seed ID, which sometimes can be referred to as a "team ID", can be part of the application identifier (not shown in the FIG. 1). The second part of the application identifier can be the bundle identifier, which sometimes can be referred to as a "bunde ID search string" (not shown in FIG. 1, but can be indicated by the name of the applications, e.g., APP1-3), e.g., a reversed domain name string. The bundle seed ID and the bundle identifier of the application identifier can be delimited by a dot. (e.g., for APP1 the application identifier (also called application ID or app ID) can be "384ACF5980.com.company.appl"). For example, in the figure, APP1 and APP2 include an identical bundle seed ID 1 (e.g., bundle seed ID 103 and bundle seed ID 105); however, APP3 has a different bundle seed ID 2 (e.g., bundle seed ID 109). The bundle seed ID of the application can be generated, and thus not manually maintainable. The application ID, which contains a bundle seed ID, can be used by provisioning profiles that may be required to build an application and to distribute the application to users or customers via, for example, an online store. The bundle seed ID (or "team ID") can differ between different development teams. The shared keychain 1 112 can be accessed by APP1, APP2, but not APP3. The shared keychain 2 114 can only be accessed by APP3. Other applications in FIG. 1 cannot use the shared keychain 2. To ensure access to shared keychains (and thus, to other applications and components), the keychain access groups and bundle seed IDs of the applications must match. In some implementations, this can be configured using entitlements. In some implementations, some applications can be prevented from using the shared keychains. This can occur when application's keychain access group and its bundle seed ID do not match with the keychain access group and bundle seed ID of the shared keychain (i.e., no valid entitlement) or missing keychain access group assignment to the application (i.e., missing entitlement). For example, APP3 106 is unable to use the shared key chain 112 because the application ID (not shown in the figure) includes the bundle seed ID 2 109, whereas the shared keychain 112 include bundle seed ID 1 113 in its keychain access group 115. APP3 have no valid entitlement, a wrong assigned key chain access group 1 at 111. APP3 106 is able to use shared keychain 114 (because of its matching keychain access group 118 and its valid entitlement). Further, APP2 104 can use shared keychain 1 112 (because of its matching keychain access group and its valid entitlement), but is unable to use shared keychain 2 114 because of the different key chain access group (i.e., APP2 has key chain access group 1 and the shared keychain has key chain access group 2). Assuming there can be a shared keychain 3 (not shown in FIG. 1), all introduced applications (APP1 102, APP2 104, APP3 106) cannot access it, because of a missing entitlement, a missing keychain access group assignment in the application.

Component 120 can manage the administration of the necessary certificates and identities. Other applications, consumer and/or client applications, have access to these certificates/identities, which can be stored in the shared keychain 112 by the component 120. Applications can access various backend systems (e.g., accessible business server in the network) through the use of a single sign-on ("SSO") process. To do so, client applications can proceed with a client-authenticated transport layer security (TLS) handshake process. To execute client-authenticated TLS handshake, a server certificate that can be provided for accessing the backend system must be trusted by the client application for a secure sockets layer (SSL) or TLS based connection. The client can provide a valid signed client certificate, which can be accepted by the server. The server can only accept signed certificates from a specific certificate authority. After confirmation the application can be logged on to the server (back-end system) with the user specified by the user's identity provided by the passed client certificate. The SSO 120 can also include its own keychain access group 123 and bundle seed ID 1 121 for the purpose of letting other applications access the certificates/identities. Only entitled applications (applications with the correct keychain access group and bundle seed ID) are allowed to access the keychain data.

Figure 2:
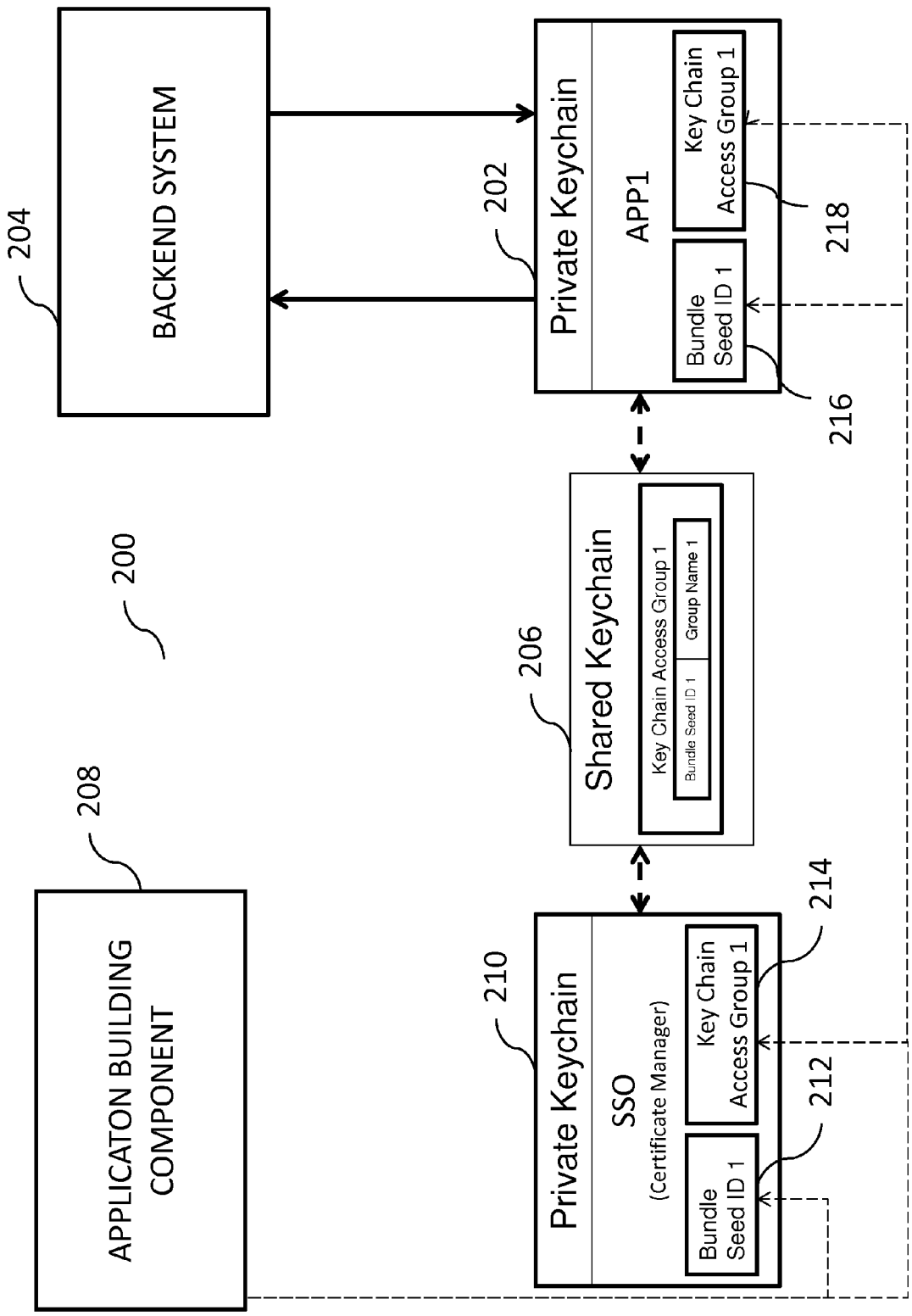
FIG. 2 illustrates an exemplary system for providing a distribution of an application.

FIG. 2 illustrates an exemplary system 200 for providing distribution of an application. In some implementations, the system 200 can be application or build system specific. The application building component 208 can provide on demand application building and/or a new build if the application should be changed (in the event, for example, if a bundle seed ID changes or a key chain access group change). In some implementations, a particular SSO function can be built for an application 202 along with an implementation logic for the connection to the backend system 204 and decision logic that can be specific to particular certificates/identities to be used by an application when accessing the backend system 204. The building component 208 can build applications. This can include at least one of the following tasks/functionalities: compiling, linking, pre- and post-processing, generating entitlements (i.e., use of key chain access groups), code-signing of the application with the provisioning profile certificate, distribution (e.g., using an application store), and/or any other tasks/functionalities. The applications 210 and 202 can be built using the same provisioning profile. They can use the same entitlement (i.e., use a key chain access group) for a shared keychain 206. The SSO component 210, which can be a standalone application, can manage the certificates/identities. The SSO component 210 can store certificates/identities in the shared keychain repository 206. The application 202 can access the certificates/identities (or other key chain items in the shared keychain 206). The application, upon being provided with the appropriate information from the shared keychain repository 206, can connect with the backend system 204 by using a client certificate-based authentication and receive data from it, as shown in FIG. 2.

In some implementations, the application building component 208 (which can be a central build service or similar or a software development kit) can also be required to re-build the SSO/Certificate Manager application in the event of a bundle seed ID change (e.g., creation of a new provisioning profile for an application identifier) or a key chain access group change. Such action by the component 208 can be performed on demand, also manual, as in the case of the SSO component 210. A successful build updates the bundle seed ID 1 212 and the keychain access group 1 214. The component 208 can (centrally) re-build the application APP1 202. A successful build updates the bundle seed ID 1 216 and the keychain access group 1 218. As discussed in FIG. 100, the correct bundle seed ID and keychain access group is required for both applications 210 and 202 for a valid entitlement to access the shared keychain 206. The build of APP1 can also include the connection handling logic for accessing a backend server and a decision logic for which certificates/identities has to be used for the SSO functionality. After rebuild, the SSO (Certificate Manager) application 210 and the application APP1 need to be distributed (i.e., installed) on the device again.

Thus, the process shown in FIG. 2 can proceed as follows, once the building component 208 builds application 210 and 202 based on the build requirements of the SSO functionality and the applications are distributed to the device, the SSO certificate manager 210 can store certificates and identities into the shared keychain 206. The application 202 can require certificates, identities (or other data) to connect to a corresponding server, whereby certificates/identities can be provided using the shared keychain 206. Once this information is received, the application 202 can establish connection with the backend system 204 and data can be received from the backend system 204 by the application 202.

Figure 3:
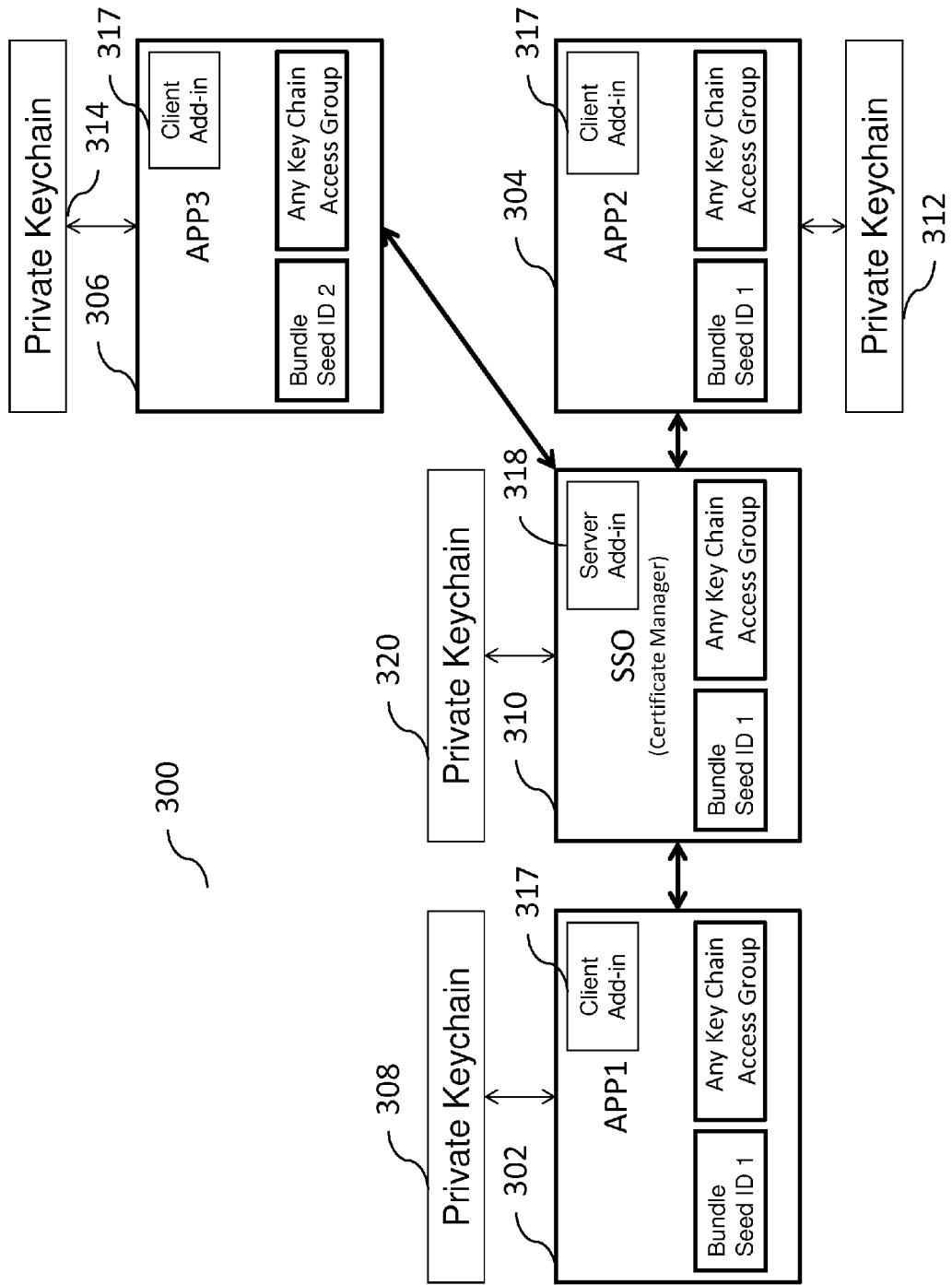
FIG. 3 illustrates an exemplary system for providing a secure communication between applications, according to some implementations of the current subject matter.

FIG. 3 illustrates an exemplary system 300 for providing a secure communication between applications, according to some implementations of the current subject matter. The system 300 can include an application APP1 302 along with its private keychain 308, an application APP2 304 along with its private keychain 312, an application APP3 306 along with its private keychain 314, and a single sign-on component (Certificate/Identity Manager) 310 with its private keychain 320. The SSO 310 component can run on the same device as APP1, APP2 and/or APP3. The SSO 310 component can hold certificates and/or identities. The SSO component 310 can further support various mechanisms to import certificates/identities into its private keychain. It can also retrieve appropriate certificates and/or identities from a server. The SSO component 310, or some of its functionalities, can also be located on a server. The applications APP1, APP2, APP3 302-306 and the SSO component 310 can include any keychain access groups. The applications can also be built with any bundle seed IDs. Access to components and applications can be provided without a requirement for matching of such keychain access groups (e.g., by using entitlements) and/or bundle seed ids among applications, the SSO component, and/or other components. The applications 302-306 and the SSO component can also communicate or exchange data with one another without using a shared keychain and/or a dependency on the provisioning profile and/or a bundle seed id and/or entitlement and/or keychain access group and/or any other dependency at build time (in comparison to the application building component 208 shown in FIG. 2). The applications 302-306 can also include a client add-in 317 and the SSO component can include a corresponding server add-in 318.

To provide secure communication of components and/or applications (where components and/or applications can be installed on user devices), a user/developer/administrator of an application can provide an appropriate certificate and/or identity to the SSO component 310. Alternatively, certificates and/or identities can be imported from a server and/or a file system and/or other common operating system's mechanisms by a user or from an online certificate store, into which the developer or administrator can upload such certificates/identities. Other certificate retrieval scenarios are possible. The private keychain of the SSO component 310 can then store the imported certificates/identities. Then, the certificates/identities can be provided to the application (e.g., APP1 302), which can include them into its private keychain. Using the provided certificates/identities, the application can communicate with and receive data from a backend system using an authenticated connection. In some implementations, the application can include a client add-in that can establish an authenticated connection with the backend system using the provided certificates/identities (for e.g. 2-way client TLS handshake).

Thus, the current subject matter can alleviate the use or reliance on shared keychains and data associated with such shared keychains as well as use of keychain access groups by storing all keychain elements including certificates and identities in the application keychain, which can only be accessible by the own application. Further, shared keychains might not be needed for this purpose. The current subject matter can also be independent from the bundle seed id (which corresponds to the application id which is used by a provisioning profile). In this case, the certificates and identities can be provided from application A to application B independently of the bundle seed id and/or entitlement and/or keychain access group and/or provisioning profile. Further, because of bundle seed ID, application ID and bundle identifier independence, no new builds are needed (e.g., FIG. 3 APP3 has another bundle seed ID) if the bundle seed ID changed or another bundle identifier should be used (e.g., to build the app for another company which uses another bundle identifier, therefore the application ID can change, another bundle seed ID can be used and shared keychain access is no longer possible), unless such builds are for new functions of the applications A and/or B. The current subject matter can also save development time and costs for applications. In some implementations, the current subject matter can include a static library that can include central functions such as connection handling and administration methods (e.g., for maintaining user and connection profiles), certificate and identities management, built-in secure communication and data exchange functionality and/or authentication management and/or login procedure. The current subject matter can include a client library (as represented by the client add-in 317 in FIG. 3) and a server library (as represented by the server add-in 318 in FIG. 3). Each of the described functionalities and similar and/or other functionalities can also be included in these libraries. The client and server libraries can be loosely coupled, e.g., using same interfaces, and understand library specific protocols. This can be based on corresponding library versions for the client and server libraries.

FIG. 10 illustrates an exemplary system 1000 that shows functionalities of the certificate manager 310 (shown in FIG. 3) and various authentication components, according to some implementations of the current subject matter. The system 1000 illustrates an exemplary memory location in a device 1002. The device 1002 can include an operating system 1004, a device memory 1020, and a file system 1006. Application A 1012 and application B 1016 can include application A memory 1014 and application B memory 1018 allocated in the device memory 1020. The device memory 1020 can also include a memory area 1010, which can be a public memory area. The device 1002 can be communicatively coupled to a server 1040. The server 1040 can be separate from the device 1002 (or form part of it). It can be located on any network that can be reached by the device 1002 (via any communication means). It can be any business enterprise system (e.g., enterprise resource planning system, etc.) or any type of server.

In some implementations, application B (which initially might not have a certificate, but wants to connect with the server 1040 for the purposes of requesting/exchanging data) can send a request to application A indicating that it wishes to connect with the server 1040, or at a minimum request a certificate or identity, which application A currently do not have. Application B can include a request data that can form the request to application A. Application A can then process the request and generate response data, which can include an authentication data (e.g., X.509 certificate). Based on the response data, application A can generate a response and send it to application B. The exchange between applications A and B 1030 can be secure data communication/data exchange. At this point, application B can send a login request to the server 1040. The server 1040 can then respond to application B by requesting authentication information. Application B then provides login information and authentication data (e.g., X.509 certificate, identity or any other type of login information) that it received from application A. The server 1040 can then decide whether or not to accept the provided login credentials or deny them (in this case, the server login procedure would be aborted). If the login information is accepted, the server 1040 appropriately notifies application B and establishes a secure connection with application B. At this point, application B can send a request for data to server 1040 and server 1040 can respond with the data.

Figure 4:
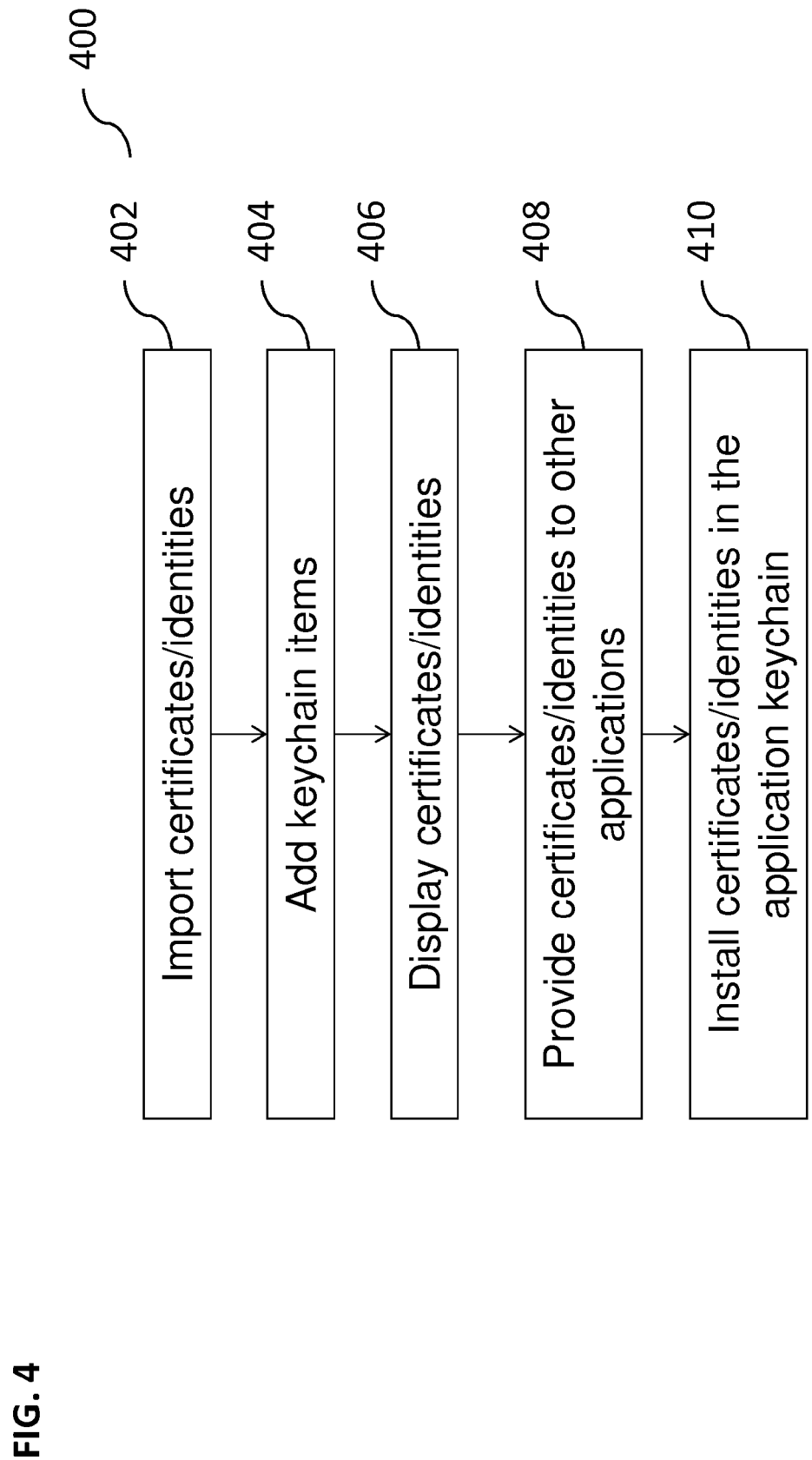
FIG. 4 illustrates an exemplary process for distributing certificates/identities between applications, according to some implementations of the current subject matter.

FIG. 4 illustrates an exemplary process for a certificate or identity distribution process between applications, according to some implementations of the current subject matter. The process 400 can be implemented using an application file system that can store certificates/identities (in some implementations, the data, e.g., certificates can be imported from an application file system and/or retrieved from a server (e.g. a certificate server), where the file system can be sandboxed) that can be used to distribute to users and/or customers. At 402, certificates/identities can be imported from the application file system into the SSO application component 310. Alternatively, the certificates/identities can be downloaded from any server (or synchronized). In some implementations, the certificates/identities can be imported from a "sandboxed" application file system (i.e., only the own application can access this file system). An application can store client software that can be used to make the certificate/identities available on the application file system, e.g., by syncing them to the device. At 404, the new key chain items (e.g., certificates/identities) can be added to the SSO component 310. This can be accomplished through selection of appropriate certificates/identities and transferring them to the SSO component 310 by storing the certificates/identities in the private application key chain (e.g., 320), for example. Optionally, at 406, the certificates/identities that are in the current application's keychain can be displayed to the user on the user device's interface. At 408, the certificates/identities can be provided (e.g., by a secure data exchange 1030) to other applications (e.g., application 302-306). The certificates/identities for the distribution can be selected by the user or can be configured e.g. by specifying which certificates/identities should be provided to which applications. At 410, the certificates/identities can be installed in the application keychain (e.g., 308, 312 or 314) and, optionally, displayed to the user. The other applications can now use the certificates/identities for their purpose, e.g. as credential for a backend server connection.

Figure 8:
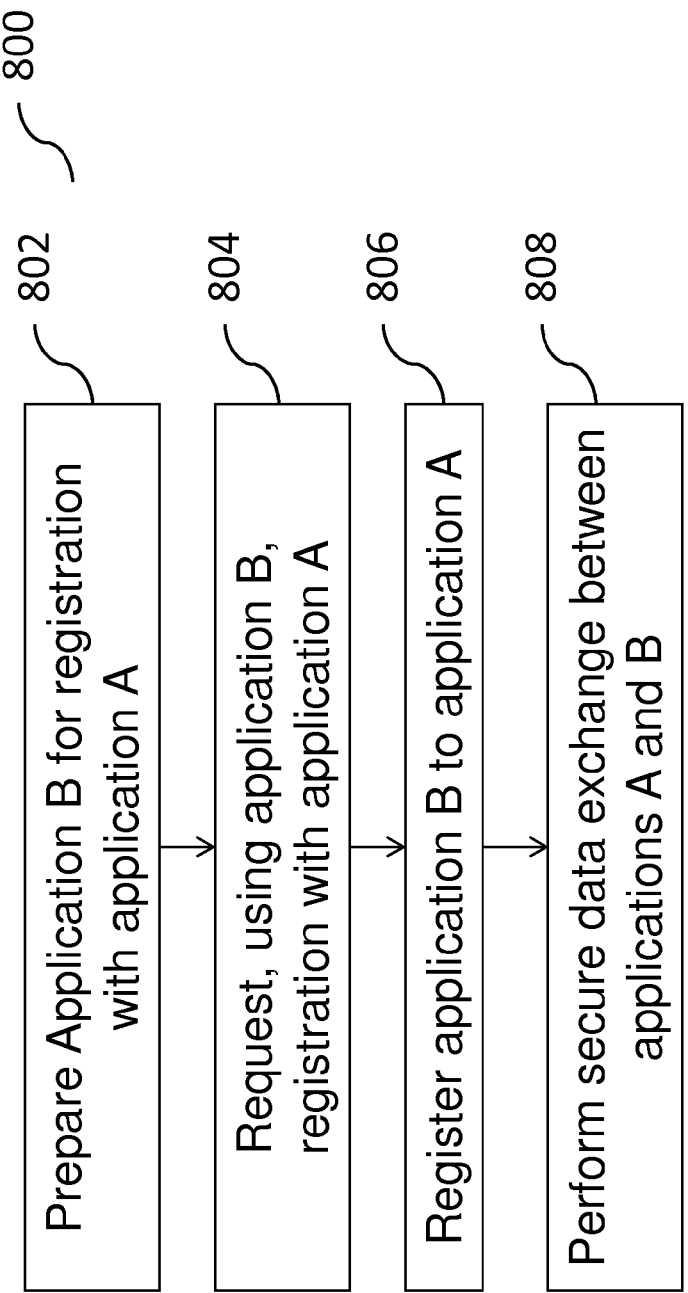
FIG. 8 illustrates an exemplary process for providing trusted secure data exchange between applications, according to some implementations of the current subject matter.

The SSO client application component can communicate with the SSO server component using a token-based data access on user devices using a pasteboard as a kind of communication channel. This can allow receiving certificate/identity updates by providing certificates and identities from one application (e.g., SSO APP/Certificate Manager) to another application (e.g., APP2). In some implementations, the SSO server component can be run in a background, which avoids leaving the current SSO client application. The certificates/identities can be requested by the client application and/or updates could be scheduled, e.g., at any given time frame, every week, and/or at any predetermined time period. This can allow distribution of new certificates for accessing new business systems and/or if certificate/identity expires. The new certificates can be provided using various notification services (local and/or server triggered) and can be sent to the SSO server application. The SSO server application can distribute the certificates and/or identities to all installed applications on the current device, which can have a SSO client add-in incorporated or, alternatively, on demand, e.g., by requesting a registered application (as shown in FIG. 8 and discussed below in connection with the registration process 800). Additional distribution scenarios and/or variations are possible. The SSO client application can be any application that can be installed on a user device (e.g., a mobile device) and can be linked to a SSO client add-in library for obtaining updates, certificates, identities, etc. The SSO client add-in library 317 (represented by a client application) can communicate with a server add-in library 318 (represented by a server application) that can be installed on the user's device and can assist the user with adding, deleting, changing, updating, importing, etc. of a particular certificate/identity. It can also assist the user with connection handling for a particular application as well as various administrative tasks.

Figure 5:
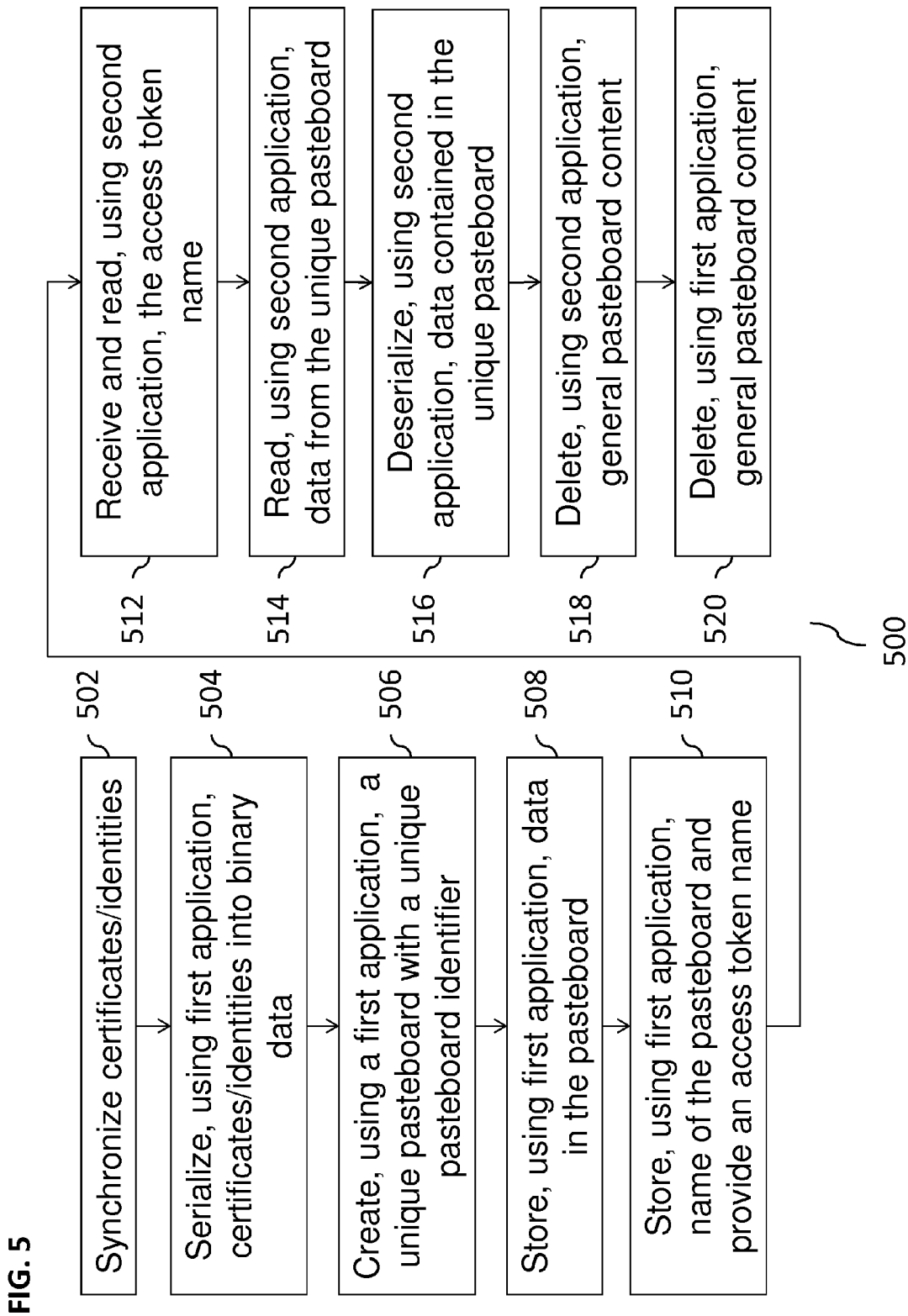
FIG. 5 illustrates an exemplary process for providing certificates/identities from one application to another application, according to some implementations of the current subject matter.

FIG. 5 illustrates an exemplary method 500 for providing certificates/identities from one application (or first application) to another application (or second application), according to some implementations of the current subject matter. One application can be a SSO provider and can copy the identities/certificates into a pasteboard. The other application can be a SSO client application and can then import the certificates/identities into the application keychain. Such copying can be implemented using an add-in that can be installed in the SSO client application. In some implementations, the certificates/identities can be copied as binary data via the pasteboard. The copied certificates/identities can be stored in an array or a dictionary (or similar type) and then stored as binary data. In some implementations, this procedure can also be used to transfer any data from one application to another application.

The process 500 can begin with synchronizing certificates and/or identities, at 502, which is optional. At 504, the first application serializes certificates/identities into binary data. At 506, a unique pasteboard can be created by the first application and assigns a unique identifier to the pasteboard for future reference. At 508, the binary data can be stored by the first application in the pasteboard. At 510, the first application can store the name of the unique pasteboard and provide an access token name for the second application in the general pasteboard to receive and read. At 512, the second application can receive and read the access token name stored by the first application. At 514, the second application can read the binary data from the unique pasteboard. At 516, second application can deserialize the binary data contained on the unique pasteboard into certificates/identities and delete general pasteboard content, at 518. At 520, the first application can also delete the general pasteboard content. At 514-520, the unique pasteboard data can be also deleted.

In some implementations, token based data access can be used to provide data from one application to another application using a pasteboard, where the pasteboard can be a memory location that can be accessed by the applications. In some implementations, the pasteboard can be made persistent and the data can be available even if the application ended. Alternatively, the pasteboard can be a temporary pasteboard, which can be removed if the application closes. The general pasteboard can be accessed by all applications without further specifications. Other pasteboards, e.g., named or unique pasteboards, can be accessed by specifying them. The general pasteboard can remain if the pasteboard is a system pasteboard, but the content can be temporary until the device is powered off or any other device or application specific event occurs, which can cause content removal. There can be a further named pasteboard by the application or a unique pasteboard, which can have a generated identifier, and can exist with this identifier only once. It can also be a combination of named and unique pasteboard. All kind of pasteboards can have in common that they are in general accessible by all applications. If applications do not know the name or identifiers, they can query them by operating system functionality, e.g., by the content type or other specifying indicator, before accessing the pasteboards. In some environments, pasteboard and/or pasteboard data change can also trigger notification of specific applications. The notification can contain information about the circumstance if data was added, deleted or changed of the corresponding pasteboard. In some cases, applications can register to such an event, to get notified about pasteboard content changes. Additional or other as above listed pasteboard functionality can exist.

Figure 11A:
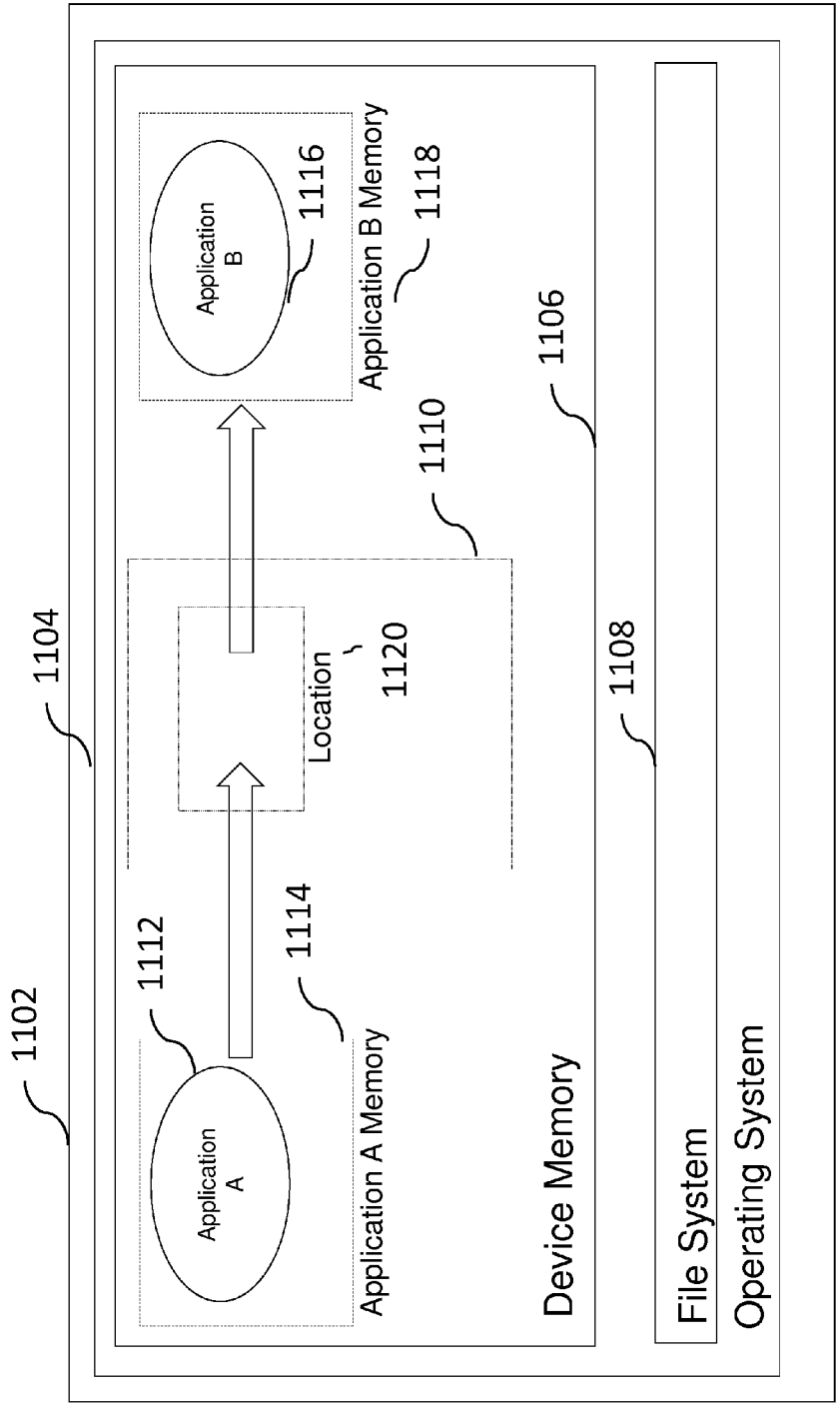
FIGS. 11a-b illustrate exemplary memory location and read/write processes that can be performed in a memory of a device.

FIG. 11*a* illustrates an exemplary memory location in a device 1102. The device 1102 can include an operating system 1104, a device memory 1106, and a file system 1108. Application A 1112 and application B 1116 can include application A memory 1114 and application B memory 1118 allocated in the device memory 1106. The device memory 1106 can also include a memory area 1110, which can be a public memory area. Application A can perform writing to a memory location 1120 within the public memory area 1110 (as indicated by an arrow) and application B can perform reading from the memory location 1120. A memory location can be, for example, a pasteboard, clipboard, data container or similar kind of memory.

Figure 11B:
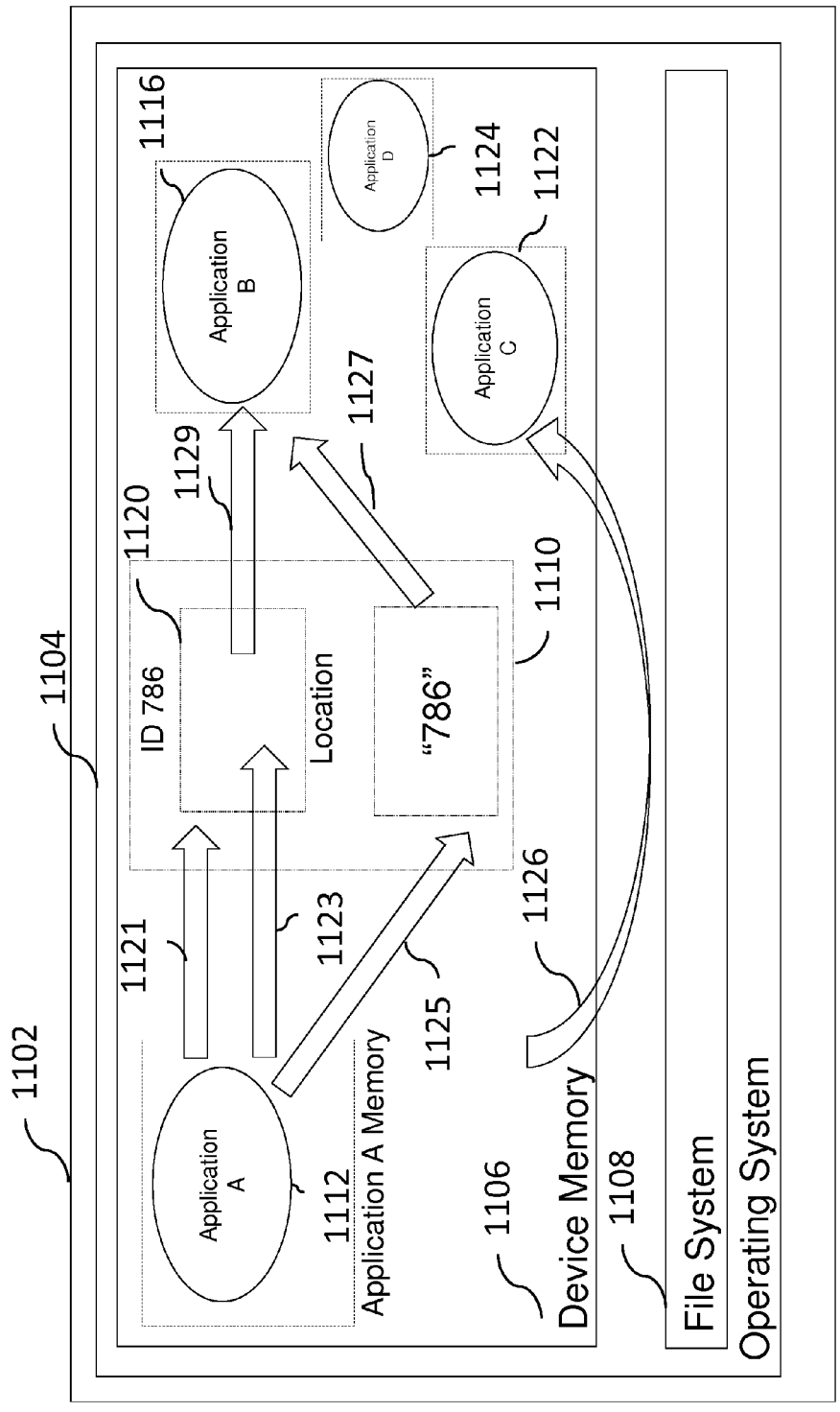

FIG. 11*b* illustrates another exemplary memory location in the device 1102. FIG. 11*b* includes elements that are similar to the elements shown in FIG. 11*a* and are identified by the same reference numerals. In addition to FIG. 11*a*, the device memory 1106 can include application C 1122 and application D 1124 that can include corresponding memories allocated in the device memory 1106. In some implementations, application A can create the memory location 1120 (that can be identified by "ID 786", for example), as shown by arrow 1121 and write data to that location, as shown by arrow 1123. Application A can then indirectly provide (as indicated by arrow 1125) location information ("786") to the public memory area 1110 or directly notify a specific application of the memory location (in this case, it is application C that is being notified by application A, as shown by arrow 1126). Application B can read the memory location information "786", as shown by arrow 1127 and then read the data from the location 1120 in the memory area 1110, as shown by arrow 1129. Application C (assuming it was notified of the location "786), can also execute reading of the location information and/or reading of the data (arrows 1127, 1129). As can be understood, other application can write to the location that can be created by application A (or any other application). For example, application A can create the memory location having an "ID 786" and directly (e.g., to a specific application) or indirectly provide location information "786" (which can be read by any application in the device memory), then application B can read the location information "786" and write data to the memory location having that identification information. Application A can then read the data that is written by application B (or any other application).

Figure 6:
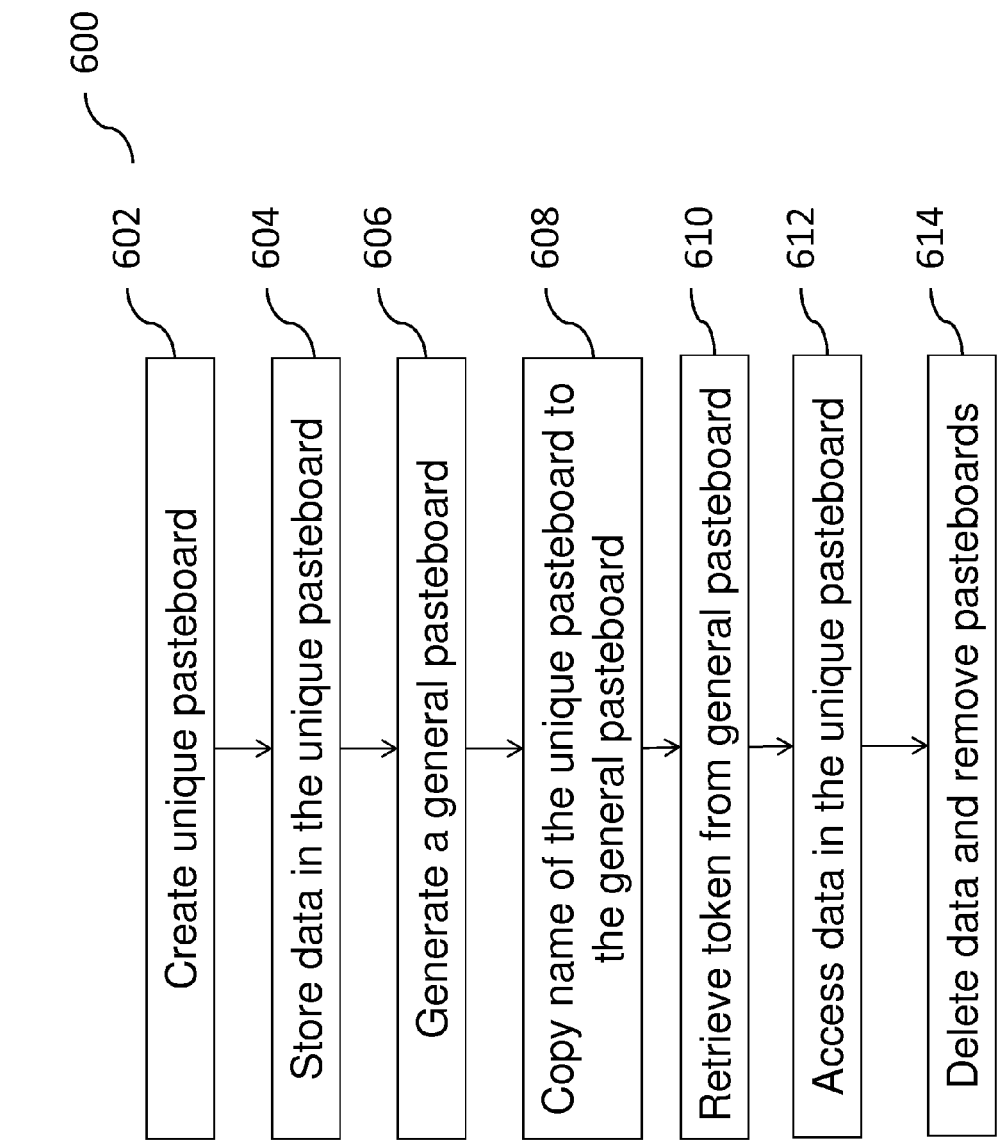
FIG. 6 illustrates an exemplary process for providing token-based data access, according to some implementations of the current subject matter.

FIG. 6 illustrates an exemplary method 600 for providing token-based data access, according to some implementations of the current subject matter. At 602, a unique pasteboard can be created by allocating memory for data. Data can be binary data or any other data. The unique pasteboard can be a named pasteboard and/or a similar memory area. At 604, data can be stored to the created unique pasteboard. At 606, general pasteboard can be generated or if already existing access to it can be created. At 608, unique pasteboard name can be copied to the general pasteboard. This can be accomplished by assigning a data pointer to the token, where the data pointer can be a unique pasteboard. At 610, a token can be retrieved from the general pasteboard. At 612, the data in the pasteboard can be accessed. The general pasteboard can contain the token for data access. Other applications on the user device can read the token from the general pasteboard and access the data in the unique pasteboard. At 614, data can be deleted and pasteboards can be removed. Data can be removed after user is finished using it. If the unique pasteboard is persistent, the application, which created it, can remove the pasteboard. The general pasteboard data can be removed after user's use as well. The general pasteboard can be a system pasteboard and thus, persistent. The general pasteboard data can be in most cases not persistent. This method can provide a data exchange, which can be used, but is not secure. Other application which paste general pasteboard content will see only the unique pasteboard identifier. The data can be also accessed, if the concrete implementation of this method is also known to foreign applications (i.e., not intended to be involved in the data exchange process).

In some implementations, the current subject matter system can provide secure data exchange on various users' devices. Such data exchange can include data exchange between applications, servers, devices, etc. The following discussion uses two applications on the same device to illustrate such secure data exchange. The data exchanged can be any data. In some implementations, the data exchange can take place between application A, which can be a server application that can provide data and application B, which can be a client application that can receive data. The secure data exchange between applications can be based on pasteboard data exchange and/or custom URL schemes (e.g., HTTP or a different protocol) and/or notifications. In some implementations, instead of custom URL schemes, a technique that can call/execute another application on the device can be used. In some implementations, instead of calling the applications directly, a local or remote notification service can be used. A typical scenario for a remote notification can include Application A sending a notification to application B by connecting to a server, located in the accessible network, and initiating a push notification to application B. Application B is therefore notified, using a messaging technique, and a call can be triggered by the remotely received message, where a local notification scenario can be executed on the local device, without server interaction, but using a notification or messaging technique. Other variations can also exist.

Figure 7:
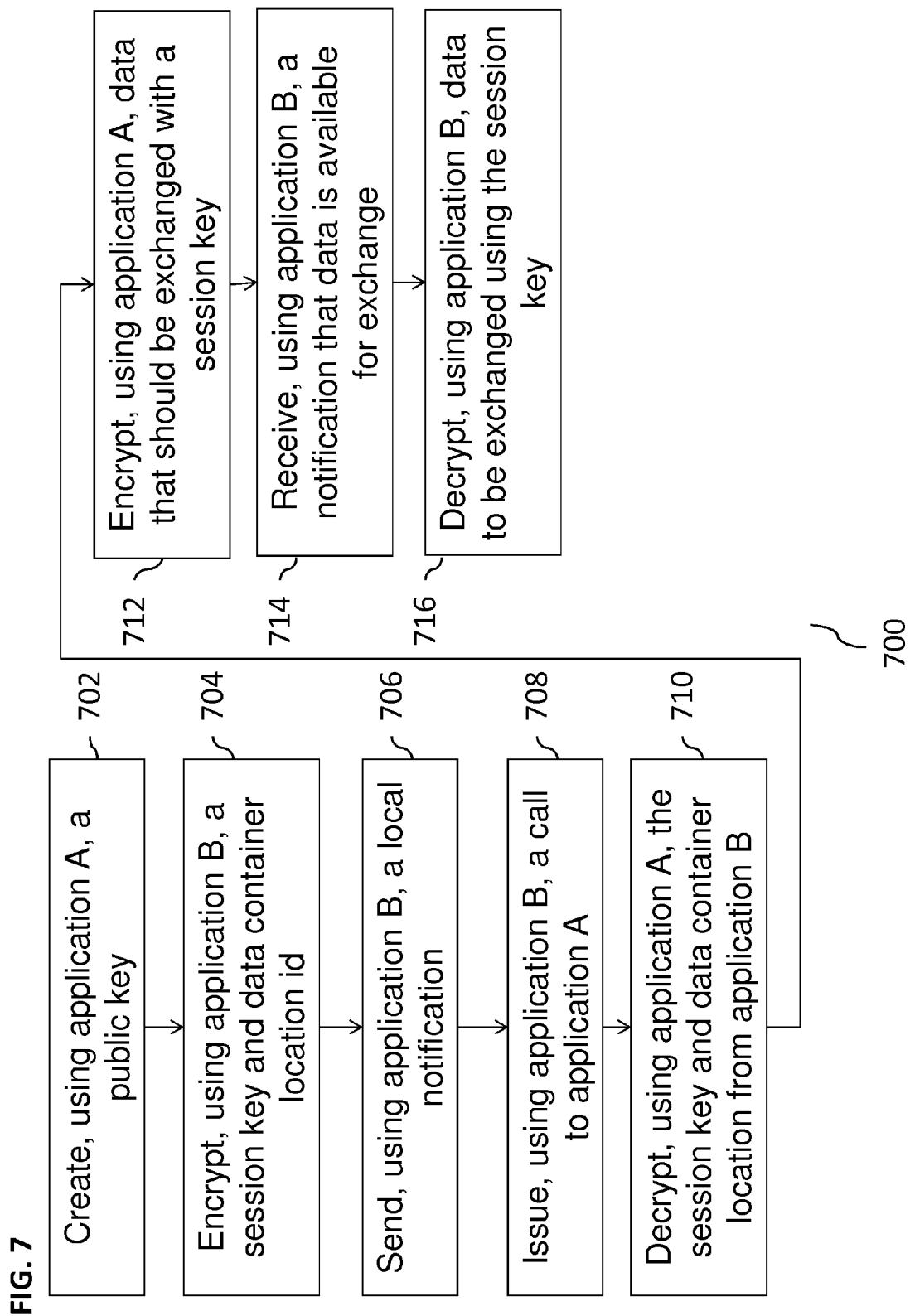
FIG. 7 illustrates an exemplary process for secure data exchange between applications, according to some implementations of the current subject matter.

FIG. 7 illustrates an exemplary process 700 for secure data exchange between two applications, according to some implementations of the current subject matter. At 702, application A can create public key for the purposes of encryption. In some implementations, application A can create an RSA public key or any other type of key for the purposes of providing an encryption (e.g., using an asymmetric cryptographic system). A corresponding private key can also be created. The private key can be used for decryption and thus, is not discarded or disposed. If a key is discarded, in an asymmetric encryption system, a new key pair (public/private) may need to be generated. Public and private key (key pair) can have specific properties, e.g., key length and mathematical characteristics, which can be defined by the cryptographic system. Both keys can be stored in the application key chain. The public key can be composed of binary data and can be encoded into a string format. The key creation operation can also include creation of a named (or unique) pasteboard ("UP") and/or general pasteboard ("GP"), creation of the public key, and then encoding binary data of the key into a string. The general pasteboard can already exist (for example, it can be provided by the operating system), and as such can be used (and not created again). The named pasteboard can store the public key for encryption, e.g., accompanied with any additional properties which can be a hash value and/or the application ID and/or other property values, and be persistent until a predetermined time (e.g., rebooting of the user's device) and/or permanently persistent (e.g., until uninstallation of the application). The named pasteboard can be derived using an application name and/or any other similar characteristic or procedure. The public key data can be encoded into a string using any type of encoding. The named pasteboard can be deleted after data exchange is completed. In some environments, Application A can be informed (also at a later stage) about changes of pasteboard content by other applications. It can decide to create a new pasteboard (and e.g. can remove the old pasteboard and/or remove the pasteboard data) with a new (or same) public key or update the existing pasteboard data with the correct public key or can execute any exception handling on it. Beside this application B can also receive a notification about any changes and can decide how to continue in its verification procedure and how to proceed in such a specific case. While the encoding of the key is not mandatory, the key can be stored in any usable data format and/or binary format. If this is the case, then the following operations 704-716 can be performed in various ways.

At 704, the session key and the data container location id can be encrypted by application B. Application B can read the pasteboard data created, at 702, by application A and can create a unique pasteboard, which can be used as a container for the later data exchange. The UP can be made not persistent. The UP can act as a container to store the data which can be securely exchanged. Application B can encrypt a random generated session key and the UP name using the public key stored in the named pasteboard at 702. Before applying an encryption, application B can verify applications A public key, e.g., using the provided hash value. It can also verify if it received a notification of a pasteboard content change, which can indicate that the public key was exchanged (either by Application A or another application) and process any specific verification procedure, either requesting a new key from application A or prompting the user to verify the hash value (as indicator of a still valid public key) and/or can decide to abort or continue with the operation 704. Further variations can be possible.

The encryption operation 704 can include various operations that can be performed by application B. These can include reading the public key of application A from the named pasteboard, decoding the public key, creating a unique pasteboard, creating a random session key, storing the random session key and unique pasteboard name in a dictionary, serializing the dictionary, and encrypting the serialized dictionary.

The named pasteboard can be derived by application A's name and a specified appendix, which can be "publickey" (e.g., "com.company.appa.publickey"). It can also be generated by any other procedure or can have another name or ID. The public key can be decoded from string format to binary data. This procedure can reverse encoding of the public key that was performed during operation 702. Random session key can be a symmetric random session key, which can be used for encryption/decryption of data to be exchanged. The key can be used for a symmetric encryption system. It can be determined by specific rule set, which, in an ideal scenario, can be random. The random session key and the unique pasteboard name can be stored in a dictionary or similar data type. Further, since the dictionary data type can be an object instance at runtime, to exchange data, the dictionary can be serialized before being stored or passed to another application, where serialized data can be in a binary format (or another representation).

At 706, a local notification can be sent within application B. The notification can be scheduled to be sent at a predetermined time. The predetermined time period can be during a regular processing time of application A's time frame which can be needed to provide data to be exchanged.

At 708, application B can issue a call to application A. Application B can provide application A with the random session key and the location ID (which can be the name of a unique or a named pasteboard) where the data can be exchanged. The complete transmitted data can be encrypted using the public key of Application A. The call from application B to application A can include the encoded encrypted session key and location data as parameters. Both parameters can also be stored in a dictionary, which can be serialized, encrypted and encoded, and passed instead of multiple parameters. Additional parameters are possible and can include specifying data, which is requested to be exchanged. Application A can be called by using a custom URL scheme and/or similar technique, which can include any accepted protocol between applications A and B.

At 710, application A can decrypt the session key and location data provided to it by application B. Application A can receive the data transferred by the custom URL scheme. Application A can decrypt the received information by using the private key, created at 702, and retrieve the session key and pasteboard name data, which can be the location id indicating the data container location for later data exchange. The operation 710 can also include various operations performed by application A. These can include decoding a URL scheme parameter, deserializing received serialized binary data, obtaining unique pasteboard name, and the generated random session key. The decoding can include decoding of the encoded URL scheme parameter (which can include data) into the encrypted binary data that can contain the session key and data container location (which can be equivalent to location data). Data decryption can include decryption of the serialized encrypted dictionary, which can be in the form of binary data that was encrypted using the public key during operation 702. The dictionary can receive the deserialized binary data, where deserialization can create an instanced object of the dictionary. The unique pasteboard name and the random session key can be obtained from the dictionary as well. At 710, it can be the case that the encrypted data cannot be decrypted by application A, e.g., because of a wrong used encryption key. This can trigger any error process, which can result in notifying application B about this circumstance. The process can be aborted or continued in any other ways, for example, application A can create a new key pair (e.g. by repeating 702) and provide the new public key to Application B, wherein the process can be continued at 704. Further error handling scenarios can be possible.

At 712, the application A can encrypt the data which should be exchanged. This can be accomplished using a symmetric encryption method or any other method, in this case using the random session key. The encrypted data can be placed into the data container location (indicated by the data container location ID) which can be the unique pasteboard. This operation can include serialization of the data to be exchanged, encryption of the serialized data using the random session key, storing the encrypted data and size in an exchange dictionary, serializing the exchange dictionary, and storing the serialized data in the unique pasteboard.

Assuming the data type is an object instance at runtime, exchange of data between two applications, the data can be serialized before being stored or passed to from one application to another application. The serialized data can be in binary form. The encrypted data including any metadata information, e.g., size and kind of data, can be stored in the exchange dictionary. The exchange dictionary can be an object instance at runtime. To exchange this data it can be serialized before stored or passed to another application. The serialized data can be in binary form. The encrypted data which can be available in a serialized binary form including its metadata can be stored in the unique pasteboard. The pasteboard can be created by application B as a container. Application A can reference the location of the created pasteboard and not create a new pasteboard.

At 714, application B can receive the local notification that the data to be securely exchanged is now available (which can be triggered at 706).

At 716, application B can decrypt the data to be exchanged using the random session key. Application B can know that the encrypted data is available in the unique pasteboard (created in 704). If the data is not available because the local notification was received too early, the application B can verify availability of the data at a later time and/or perform any and/or all operations 702-716 again. Additionally, a synchronization mechanism can be implemented. Further, the operation 716 can also include various operations performed by application B. These can include obtaining the encrypted data of the unique pasteboard, deserializing the exchange dictionary, reading the encrypted data and size from the exchange dictionary, decrypting the serialized data using the random session key, and deserializing the exchanged data.

The encrypted data which is available in a serialized binary form including its metadata can be stored in the unique pasteboard. The encrypted data can be of any data type, such as an object instance of a specific class object and/or any other data type. As stated above, the pasteboard can be created by application B as a container. Application B can reference the location and not create a new pasteboard. The data in the pasteboard can be a serialized dictionary, where the serialized data can be in binary form. Application B can create a new dictionary instance at runtime by deserialization of the binary data into an instance object. The instance object can be a runtime ("living") representation of a class object specified by any class type. The encrypted data including metadata information, e.g., size and kind of data, can be stored in the exchange dictionary. The binary data can be decrypted using the session key by using various decryption methods (depending on encryption operation used in 712, shown in FIG. 7). To deserialize data, application B can create a new object instance at runtime by deserialization of the binary data into an instance object, which can be a representation of the original object instance which was exchanged. Further, the deserialization can depend on the kind of data.

In some implementations, the process for secure data exchange can include a trusted secure data exchange between applications. The process can be similar to the process 700 discussed above. FIG. 8 illustrates an exemplary process 800 for trusted secure data exchange between applications, according to some implementations of the current subject matter. In some implementations, the process 800 can involve various operations of the process 700 shown and discussed in connection with FIG. 7 and can be also based on a previous registration of application B, whereby application B can register with application A to be trusted and request data from application A, where application A provides data to the now trusted application B and application B received data from application A.

At 802, application B can be prepared for registration with application A. Application B can read the pasteboard data created during operation 702 of the process 700 as shown in FIG. 7. Application B can create registration identification (ID) information which can be persistent. The registration ID (or key) can be used together with an application identification information. Application B can encrypt the registration key and the application ID using the public key contained in the named pasteboard. The operation 802 can also include various operations, which can include reading the encoded public key from the named pasteboard, decoding the public key, creating a random registration key, storing the registration key and the application ID in a dictionary, serializing the dictionary, and encrypting the serialized dictionary.

Similar to the discussion above, the public key of application A can be read from the named pasteboard, where the named pasteboard can be derived by application A name and a specified appendix (e.g., "com.company.appa.publickey") or determined by any other procedure. The decoding of public key from string format to binary data can reverse the encoding performed during operation 702. The registration key can be used together with the application ID to register application B in application A as a trusted application at a later stage. The registration key and the application ID can be stored in a dictionary. The dictionary data type can be an object instance at runtime and can be serialized before being stored or passed to another application in order to exchange data. The serialized data can be in binary form or any other form. The serialized dictionary can be encrypted using the public key from application A.

At 804, application B can request registration from application A. Application B can provide application A with its application ID and a generated registration key. The transmitted data between applications can be encrypted using the public key of Application A.

At 806, application A registers application B as a trusted application. Application A can receive data transferred using e.g., a custom URL scheme (or an equivalent call, e.g., using HTTP or another protocol). After decoding, application A can decrypt the received information into a registration key and application ID. Operation 806 can include the following operations: decode the URL scheme parameter, decrypting data, deserializing the binary data into a dictionary, confirming whether application B should be trusted, and registering application B as a trusted application. Decoding operation can include decoding the encoded URL scheme parameter (data) into the encrypted binary data. The encrypted binary data can be decrypted into serialized data using the private key generated in operation 702 of process 700. The serialized data can be in a binary form or any other form. It can be deserialized into a dictionary which can contain the registration key and the application ID. Deserialization can create an instanced object of the dictionary. The application ID of application B and the registration key can be obtained from the dictionary. Application A can then confirm that application B's ID can be trusted and registers application B's ID with its registration key. This can be done by storing the data in the application key chain or in the local file system (which can be encrypted). Registration can be persistent, which can be subject to uninstallation of application A. The user of application A can decide at any time to remove the registration. There can be other registration scenarios. For example, a registration can contain a success result which can be provided back to application B. The result of a successful registration can contain, beside other data (e.g., a confirmation of the registration key), a public key (asymmetric) returned to application B, in this case application A stores the private key also with the registration data, or a key (symmetric), also stored in application A with the registration data, returned to application B for further encryption processes. If it is a symmetric key, it can be sent back, in an encrypted way. To ensure this, the initial registration request to application A can include a session key. Instead, the asymmetric key can be unencrypted. The registration process, as described in the steps 802-806, can be executed using a secure data exchange process as described in 700 (process 900, systems 1200/1300) or any other methods or variants.

At 808, secure data exchange process 700 can be performed. In addition to operations 702-716, the operation 808 can also include encryption of the session key, data container location id and registration, which can consist of the registration key and the application ID, (operation 704 in the process 700), application B sending a local notification (operation 706 in the process 700), calling application A (operation 708 in the process 700), decrypting session key and data (operation 710 in the process 700) and verifying registration, encrypting data to be exchanged (operation 712 in the process 700), receiving local notification by application B (operation 714 in the process 700), and decrypting the exchanged data by application B (operation 716 in the process 700). Verification of registration data by application A verifies the registration data by determining whether the provided registration ID (which can correspond to the registration key) and the corresponding application ID can be trusted. This assumes that application B has a valid registration. If application A determines that it can trust application B, then encryption of the data to be exchanged can be performed. Besides the described process 800, any other registration process can be used, as long as the result is a valid registration of application B to application A. Also, an opposite registration, i.e., application A is registering to application B, is possible and can be used in various implementations of the current subject matter system to ensure a both-sides trust relationship between the applications. Further, registrations of multiple applications can be possible.

FIG. 9 illustrates another exemplary process 900 for secure data exchange between two applications, according to some implementations of the current subject matter. The process 900 is similar to the process 700 discussed above and shown in FIG. 7. The process 900 can also be used in a two-way custom URL scheme process. At 902, application A (or the server application) can dispose a public key for encryption purposes. Then, at 904, application B (or the client application) can encrypt a session key, caller and data container location ID. At 906, application B can then call application A. At 908, application A can decrypt session key and data container location ID and encrypt the data that should be exchanged and place it into the data location container (i.e., the data location container indicated by the data container location ID), at 910. Application A can then call application B, at 912. At 914, application B receives the call from application A. At 916, application B decrypts exchanged data, which can be found in the data container location.

Figure 12:
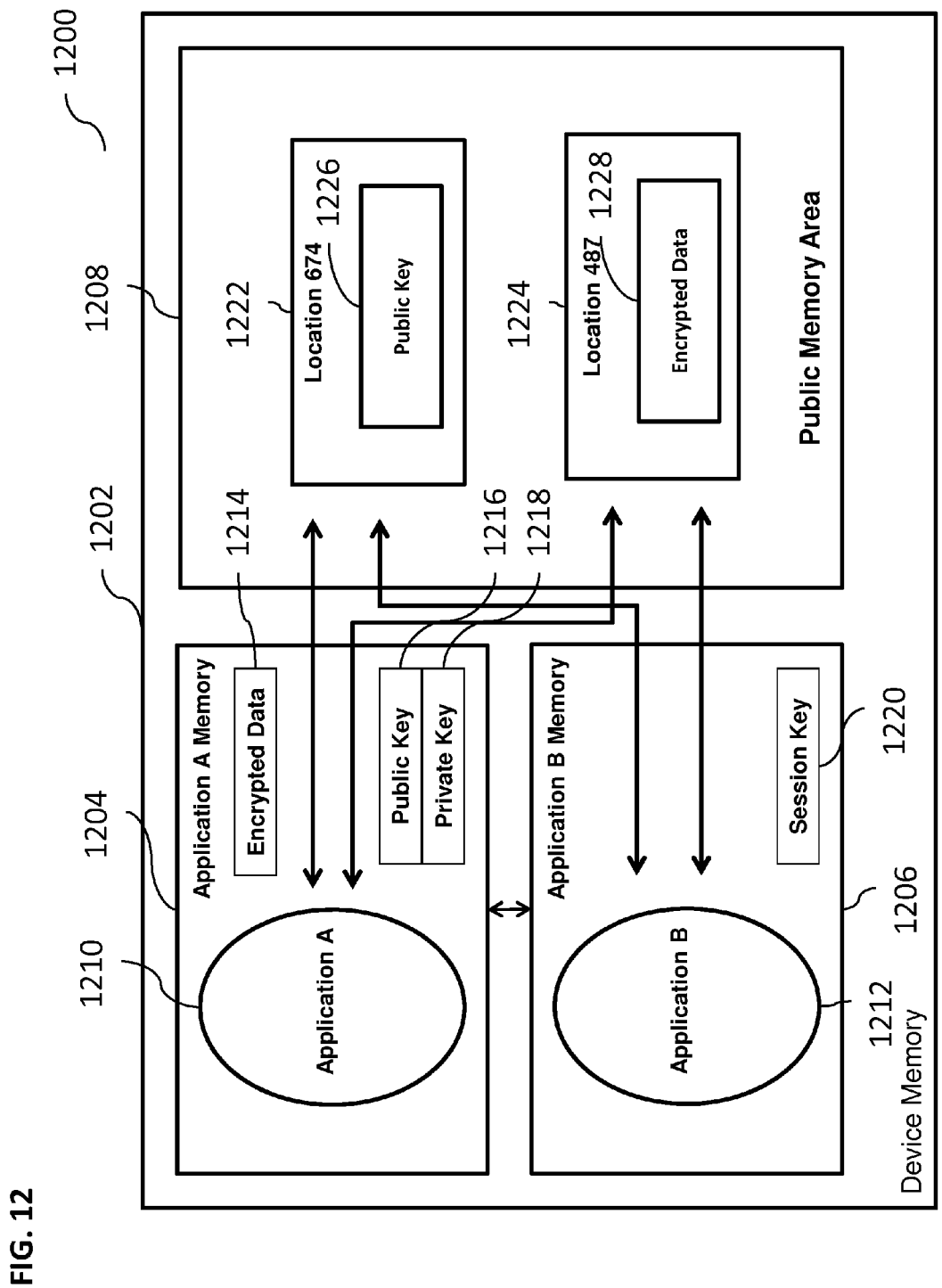
FIG. 12 illustrates an exemplary system for performing a secure data exchange using a combination of symmetric and asymmetric cryptography, according to some implementations of the current subject matter.

FIG. 12 illustrates another exemplary system 1200 for performing a secure data exchange (as shown in FIGS. 7-9 by processes 700, 800, 900, respectively, and indicated by arrow 1030 on FIG. 10), according to some implementations of the current subject matter. In some implementations, the system 1200 can be used to provide secure data exchange in a hybrid cryptographic system that can combine asymmetric and symmetric cryptographic methodologies. The system 1200 can also be used to provide secure data exchange using asymmetric cryptographic techniques. The system 1200 can include a device memory 1202 (which can be incorporated into a device, such as the one shown in FIGS. 10 and 11*a-b*), an application A 1210 with application A memory 1204 that is allocated within the device memory 1202 to application A, an application B 1212 with application B memory 1206 that is allocated within the device memory 1202 to application B, and a public memory area 1208 that can be allocated within the device memory 1202. The applications A and B and the public memory area 1208 can be configured to exchange data in accordance with the methodologies discussed below.

In some implementations, the data to be exchanged between applications A and B in the system 1200 can be encrypted using a combination of symmetric and asymmetric encryption. In some implementations, in the system 1200, application B can issue a direct call to application A and request exchange of various data from application A. Application A can prepare data requested by application B and send a notification to application B and/or send data to application B. In order to exchange data, application A can create a key pair (a public key 1216 and a private key 1218) to be used in an asymmetric cryptographic system. Application A can also create a memory location 1222 in the public memory area 1208. An identifier ("ID") "674" can be assigned to the memory location 1222. After the ID is assigned to the memory location 1222, application A can dispose the public key 1216 into the memory location 1222 (shown as public key 1226). Application B can create a session key 1220 that can be used for symmetric encryption and decryption. Application B can also create a memory location 1224 in the public memory area 1208. An identifier "487" can be assigned to the memory location 1224. Application B can also access the public key 1226 that has been disposed in the memory location 1222 by application A. Application B can also encrypt the session key and location ID (location ID 487) using the public key that it accessed from the location 674 using an asymmetric cryptographic system. As a result of the encryption, application B can generate encrypted data that contains the session key and the location ID. It can also generate a local notification for application B which can be received at later point of time. Application B can issue a call to application A using the encrypted data. At which point, application A can decrypt the session key and location ID (location ID 487) using the private key 1218 (using the above asymmetric cryptographic system). Once the session key and the location ID are decrypted by application A, application A can encrypt the data that will be exchanged. The exchanged data can be encrypted using the session key (using a symmetric cryptographic system). Once the exchanged data is encrypted, application A can store the encrypted data 1214 in the memory location (indicated by location ID 487) 1224 as encrypted data 1228. Then, application B can receive the previously send local notification, which can be an indicator that the encrypted data 1228 has been stored by application A in the memory location 487 and can read the encrypted data from the memory location 487. Since the data is encrypted, application B can decrypt the encrypted data using the session key (using the symmetric cryptographic system) and generate an unencrypted data. Application B can also remove the memory location 487, including the content, from the public memory area 1208 and delete the public key, location ID 487 and session key in the application B. At the conclusion of this process, the application B will have the unencrypted data that it requested from application A.

In some implementations, in the system 1200, application B can issue a direct call to application A and request exchange of various data from application A. Application A can process the request, prepare data and create a response data for sending to application B and send a notification to application B and/or send data to application B. In order to exchange data, application A can create a key pair (a public key 1216 and a private key 1218) to be used in an asymmetric cryptographic system. Application A can also create a memory location 1222 in the public memory area 1208. An identifier ("ID") "674" can be assigned to the memory location 1222. After the ID is assigned to the memory location 1222, application A can dispose the public key 1216 into the memory location 1222 (shown as public key 1226). Application B can create a session key 1220 that can be used for symmetric encryption and decryption. Application B can also create a memory location 1224 in the public memory area 1208. An identifier "487" can be assigned to the memory location 1224. Application B can also access the public key 1226 that has been disposed in the memory location 1222 by application A. At this point, application B can create a request with session key, location ID (ID 487) and request data. In some implementations, the request can contain various additional metadata. Application B can then encrypt the request using the public key (using asymmetric cryptographic system), generate a local notification, and issue a call to application A containing encrypted data (i.e., encrypted request). Application A can receive the encrypted data and decrypt the request data using the public key (using the asymmetric cryptographic system). Once the request is decrypted by application A, application A can observe that the request contains the memory location 487, the session key and the request data. Application A can then process the request data and create a response data based on the request data. The response data can include requested data, metadata, and/or any other data. Application A can encrypt the response data for the purposes of exchanging it with application B. The response data can be encrypted using the session key (using the symmetric cryptographic system). Application A can then store the encrypted data in the memory location (memory location 487) 1224. Once the response data is stored, application B can receive a notification and read the encrypted response data from the memory location 487. Since the response data is encrypted, application B can decrypt the encrypted response data using the session key (using the symmetric cryptographic system) and generate an unencrypted response data. Application B can also remove the memory location 487 from the public memory area 1208 and delete the public key, location ID 487 and session key in the application B. At this point, application B will have the unencrypted data that it requested from application A.

In some implementations, the above hybrid (symmetric-asymmetric) secure data exchange process can be modified in the following manner. After application A stores the encrypted data in the memory location 487, application A can also issue a call to application B indicating that the data has been stored in the memory location 487 (which can avoid issuance of a separate notification to application B). When the application B receives the call from application A, application B can read the encrypted data from the memory location 487 as discussed above. Additionally, subsequent to the removal of the memory location 487 by application B, application B, in addition to deleting of the request (location ID, session key) and the public key, application B can also read data from the response data provided to application B by application A.

In some implementations, response data (as prepared by application A) can be passed during the direct call as a parameter (i.e., the response data does not contain data to be exchanged, or only parts of them, and can be exchanged using the location, but metadata of the request can be included in the parameter). This means that the response data can be passed along with the call issued by application A to application B after the encrypted data (to be exchanged) is stored in the memory location 487 by application A. In this case, Application B, can access the requested data in location 487 and verify it (using the as parameter passed metadata). Then remove the memory location 487, and the content, from the public memory area, remove response data, delete the request (i.e., location ID, session key, and delete the public key).

In some implementations, only one location can be used for public key disposal and a response can be passed during the direct call as a parameter, as discussed above. When only one memory location (e.g., memory location 674) is used, there is no need for a second memory location (i.e., memory location 487). In this case, application A can create a key pair (a public key 1216 and a private key 1218) to be used in an asymmetric cryptographic system. Application A can also create a memory location 1222 in the public memory area 1208. An identifier ("ID") "674" can be assigned to the memory location 1222. After the ID is assigned to the memory location 1222, application A can dispose the public key 1216 into the memory location 1222 (shown as public key 1226). Application B can create a session key 1220 that can be used for symmetric encryption and decryption. Application B can then access the public key 1226 that has been disposed in the memory location 1222 by application A. Application B can then create a request using session key and request data. The request can also contain additional metadata. Application B can then encrypt the request using the public key (using asymmetric cryptographic system) and call application A with the encrypted data. Application A, upon receiving the encrypted data, can decrypt the request using the private key (using asymmetric cryptographic system). Application A can then process the request data and create a response data, which is the requested data, to be included in a response (which can contain additional metadata and/or other data). Application A can then encrypt the response for exchange with application B using the session key (using a symmetric cryptographic system). At which point, application A calls application B and passes the encrypted data to application B. Application B can decrypt the encrypted data it received from application A using the session key (using symmetric cryptographic system) and obtain the response data. Application B can then read the data from the response data, delete the request, the session key, and the public key, whereby the requested data is the only one remaining with application B.

In some implementations, the current subject matter system can also create a location for the request, request data or parts of the request/request data (which can be encrypted). Application B can only pass the location ID as a parameter, which can be encrypted, to Application A (or notify application A). Application A can decrypt the request data and provide response/response data, as discussed above. Further, additional locations can be created and used.

Figure 13:
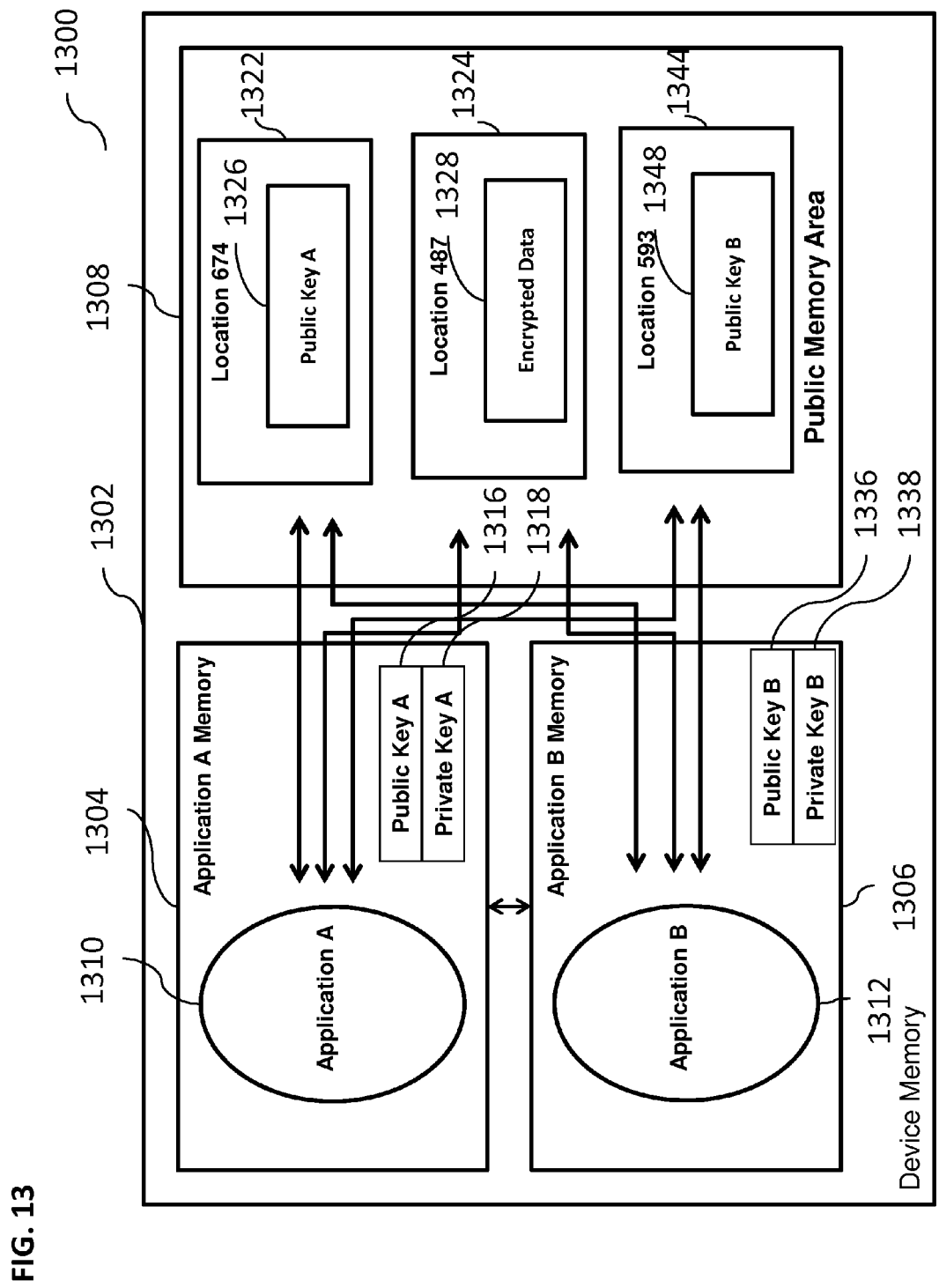
FIG. 13 illustrates an exemplary system for performing a secure data exchange using asymmetric cryptography, according to some implementations of the current subject matter.

In some implementations, the current subject matter system can be used for asymmetric secure data exchange. FIG. 13 illustrates an exemplary embodiment of an asymmetric secure data exchange system 1300, according to some implementations of the current subject matter. In some implementations, in the system 1300 having device memory 1302, application B 1312 (having application B memory 1306) can issue a direct call to application A 1310 (having application A memory 1304) and request exchange of various data from application A. Application A can process the request, prepare data and create a response data for sending to application B and send a response to application B that can include requested data. In order to exchange data, application A can create a key pair (a public key A 1316 and a private key A 1318) to be used in an asymmetric cryptographic system. Application A can also create a memory location 1322 in the public memory area 1308. An identifier ("ID") "674" can be assigned to the memory location 1322. After the ID is assigned to the memory location 1322, application A can dispose the public key A 1316 into the memory location 1322 (shown as public key A 1326). Application B can create a public key B 1336 and a private key B 1338 that can be used for asymmetric encryption and decryption. Application B can also create a memory location 1344 in the public memory area 1308. An identifier "593" can be assigned to the memory location 1344. Application B can also dispose public key B 1336 to the memory location 593 (shown as public key B 1348). Application A can obtain public key B from the memory location 593 and Application B can obtain public key A from the memory location 674. Application B can also create a memory location 1324 in the public memory area 1308. An ID 487 can be assigned to the memory location 1324. Application B can create a request for data using location ID 487 and request data. The request can also contain various additional metadata. Application B can then encrypt the request using the public key A (using asymmetric cryptographic system) and issue a call to application A containing encrypted data (i.e., encrypted request). Application A can receive the encrypted data and decrypt the request data using the private key A (using the asymmetric cryptographic system). Once the request is decrypted by application A, application A can process the request data and create a response data based on the request data. The response data can include requested data, metadata, and/or any other data. Application A can encrypt the response data for the purposes of exchanging it with application B. The response data can be encrypted using the public key B (using the asymmetric cryptographic system). Application A can then store the encrypted data 1328 in the memory location (location id 487) 1324. Once the response data is stored, application A can issue a call to application B. Upon receiving the call from application A, application B can read the encrypted response data from the memory location 487. Since the response data is encrypted, application B can decrypt the encrypted response data using the private key B (using the asymmetric cryptographic system) and generate an unencrypted response data. Application B can also remove the memory location 487 from the public memory area 1308, read data from the response data, delete the public key A (from Application B memory, if necessary), location ID 487 and request data in application B. At this point, application B will have the unencrypted data that it requested from application A.

In some implementations, the response data (parts of it and/or metadata) can be passed during the direct call from application A to application B as a parameter. Also, before removing the memory location 487, application B can verify (e.g., by using metadata) and remove response data, delete request (request data), and public key A.

In some implementations, the system 1300 can operate with two memory locations that can be used for placement of public keys A and B. (i.e., locations 674 and 593, respectively). Also, the response from application A can be passed during the direct call from application A to application B. This means that memory location 487 is no longer necessary. In this case, application A can create a key pair (a public key A and a private key A) to be used in an asymmetric cryptographic system. Application A can also create a memory location (memory location 674) 1322 in the public memory area 1308. Application A can dispose the public key A into the memory location 1322. Application B create a public key B and a private key B and can also create a memory location (ID 593) 1344 and dispose the public key B into that memory location. Application B can then create a request and can encrypt the request using the public key A (using asymmetric cryptographic system) and call application A with the encrypted data. Application A, upon receiving the encrypted data, can decrypt the request using the private key A (using asymmetric cryptographic system). Application A can then process the request data and create a response data to be included in a response (which can contain additional metadata and/or other data). Application A can then encrypt the response for exchange with application B using the public key B (using asymmetric cryptographic system). At which point, application A can call application B and pass the encrypted data to application B. Application B can decrypt the encrypted data it received from application A using the private key B (using asymmetric cryptographic system) and obtain the response data. Application B can then read the data from the response data, delete the request, and the public key A, whereby the requested data is the only one remaining with application B. In some implementations, application B can use a location for the request (or request data) and pass the location ID to application A as a parameter.

Figure 14:
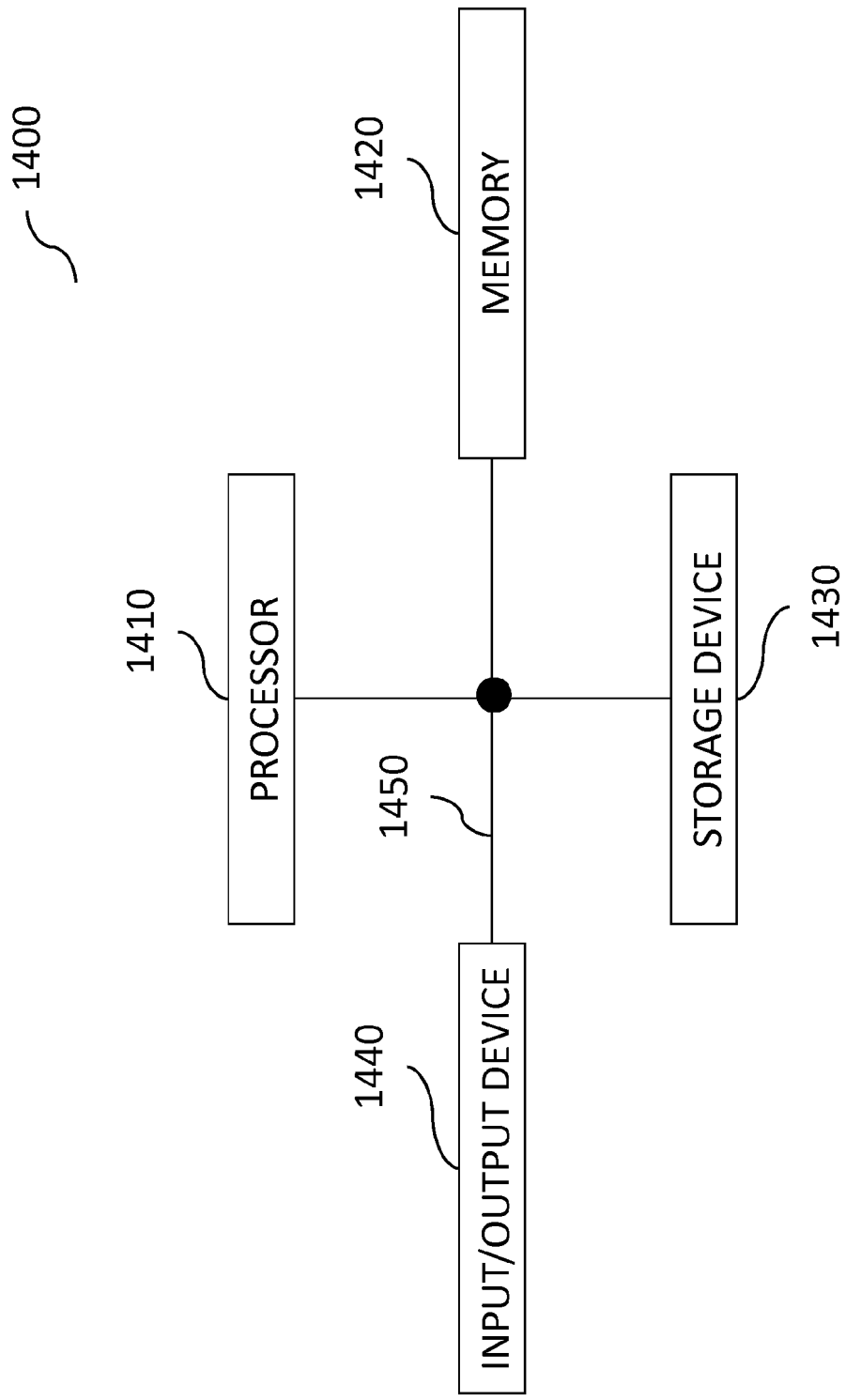
FIG. 14 illustrates an exemplary system, according to some implementations of the current subject matter.

In some implementations, the current subject matter can be configured to be implemented in a system 1400, as shown in FIG. 14. The system 1400 can include a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 1400. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

FIG. 15 illustrates an exemplary method 1500, according to some implementations of the current subject matter. At 1502, the first application can generate a first key for exchange of data between the first application and a second application. At 1504, the first application can also store the first key in a first memory location. The first memory location can be accessed by the second application to obtain the first key. At 1506, the second application can generate a second key for exchange of data between the first application and the second application. At 1508, the second application can create a data request. The data request can contain the second key and can be encrypted using the first key. The second application can also provide the encrypted request to the first application. At 1510, the first application can provide the data identified in the data request to the second application. The data can be encrypted by the first application using the second key prior to being provided to the second application. The second application can decrypt the data using the second key. At least one of the generating the first key, storing, the generating the second key, the creating and the providing is performed on at least one processor.

In some implementations, the current subject matter can include one or more of the following optional features.

The first key can be a first public encryption key. The first application can decrypt the data request using the first private decryption key. The private decryption key is not exposed. In some implementations, the first key can already be known to the second application (e.g., at compile time). Similarly, the first public key and the private key of application A can be known at compile time. The first key can also be requested by the second application and be provided to the second application by the first application in various ways. In some implementations, the public key can be accompanied by any additional properties, e.g., a hash value and/or application ID, which can be used by the second application for verification purposes.

In some implementations, the first application can store the encrypted data created in response to the data request in a second memory location. The second memory location can be created by the second application for exchanging data with the first application. In some implementations, the second memory location can be created by the first application and provided to the second application with the response. In some implementations, the second application can store the encrypted data of the data request in a request memory location. The request memory location ID can be provided to the first application. The data request can include an identification information of the second memory location.

In some implementations, the second key can be a session key generated by the second application for requesting data from the first application.

In some implementations, the first application can provide the encrypted data created in response to the data request directly to the second application. Optionally, the first application can request that the second application is registered with the first application. Registration of an application is discussed in connection with FIG. 8 (see, e.g., operations 802-806). In some implementations, the data can be provided upon successful verification of the trusted second application.

In some implementations, the second key can be a second public encryption key. The second application can decrypt the data using a second private decryption key. The method can also include storing, using the first application, the first public encryption key in the first memory location and storing, using the second application, a second public encryption key in a second memory location, wherein the second memory location is accessed by the first application to obtain the second public encryption key. Further, the method can also include creating, using the second application, a third memory location accessible by the first application and the second application, storing, using the first application, data created in response to the data request, the data being encrypted using the second public encryption key and stored in the third memory location, obtaining, using the second application, the encrypted data from the third memory location and decrypting the obtained data using the second private decryption key, and deleting, using the second application, the third memory location. In some implementations, the method can include providing, using the first application, the data created in response to the data request directly to the second application, wherein the data being encrypted by the first application using the second public encryption key and, upon receipt by the second application from the first application, being decrypted by the second application using second private decryption key.

In some implementations, the method can include deleting, using the first or the second application, the first key from the first memory location.

In some implementations, the first application can send a notification to the second application by connecting to a server and initiating a push notification to the second application (e.g., using a remote push notification or any other notification), instead of calling the application directly, and vice versa. This can be accomplished using a server supported application notification or messaging service.

In some implementations, the first application can provide data to the second application by using a third application (and/or fourth application, and/or any other number of applications). Additionally, the data can be provided using any order of creation/deletion of a location, any creating application, and/or the number of created/used locations.

In some implementations, a request/response from an application might not be required, where the secure data exchange can be performed by a process which can include the generating the first key operation, the storing operation, and the creation of the data request operation. A verification of the first key can also occur (with or without user interaction).

In some implementations, verification of the public keys can be executed by the second application before creating, using the second application, the data request, where the data request can contain the second key and can be encrypted using the first key, and the providing of the encrypted request to the first application. In some implementations, for verification purposes, a hash value and/or any other properties can be used. In some implementations, user interaction can be involved, for example to confirm if the hash code of the first application can be trusted. A warning can be issued indicating that the location content (e.g., key) has changed. In some implementations, verification can occur at any time during the process shown in FIG. 15 and can also include user interaction, such as, for example, asking to confirm a process operation, and/or ascertain if the hash value has changed (which can be an indicator that the public key changed).

In some implementations, any caching mechanisms of the keys can be involved. For example, the first key can be cached by the second application and can be used again (instead of reading from the memory location again). In some implementations, all other keys that are used can be cached (which can also have a negative effect on a grade of security), or can be stored for later re-use or for the purpose of applying them.

In some implementations, the second application can call the first application with a data request, which can be unencrypted but containing a provided public key of the second application. In response, the first application can provide the data by encrypting the data to be exchanged using the public key of the second application. The second application can decrypt the data using its private key that can be created for this data request together with the public key.

In some implementations, the second application can call the first application with a data request that can contain a second key, which can be encrypted using a known public key of the first application. In response, the first application can provide the data by encrypting the data to be exchanged with the second key of the second application. The second application can decrypt the data using its second private key that can be created for this request together with the second public key (if asymmetric) or only using the second key (if symmetric).

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
generating, using a first application, a first key for exchange of data between the first application and a second application;
storing, using the first application, the first key in a first memory location, wherein the first memory location is accessed by the second application to obtain the first key;
generating, using the second application, a second key for exchange of data between the first application and the second application;
creating, using the second application, a data request, the data request containing the second key and being encrypted using the first key, and providing the encrypted request to the first application; and
providing, using the first application, the data identified in the data request to the second application, wherein the data is encrypted by the first application using the second key prior to being provided to the second application and the second application decrypts the data using the second key;
wherein the first application stores the encrypted data created in response to the data request in a second memory location, wherein the second memory location is created by the second application for exchanging data with the first application;
wherein the data request further comprises an identification information of the second memory location;
wherein the at least one of the generating the first key, storing, the generating the second key, the creating and the providing is performed on at least one processor.

2. The method according to claim 1, wherein the first key is a first public encryption key.

3. The method according to claim 2, wherein the first application decrypts the data request using a first private decryption key.

4. The method according to claim 1, wherein the first application provides the encrypted data created in response to the data request directly to the second application.

5. The method according to claim 2, wherein the second key is a second public encryption key.

6. The method according to claim 5, wherein the second application decrypts the data using a second private decryption key.

7. The method according to claim 6, further comprising
storing, using the first application, the first public encryption key in the first memory location; and
storing, using the second application, the second public encryption key in a second memory location, wherein the second memory location is accessed by the first application to obtain the second public encryption key.

8. The method according to claim 7, further comprising
creating, using the second application, a third memory location accessible by the first application and the second application;
storing, using the first application, data created in response to the data request, the data being encrypted using the second public encryption key and stored in the third memory location; obtaining, using the second application, the encrypted data from the third memory location and decrypting the obtained data using the second private decryption key; and
deleting, using the second application, the third memory location.

9. The method according to claim 7, further comprising
providing, using the first application, the data created in response to the data request directly to the second application, wherein the data being encrypted by the first application using the second public encryption key and, upon receipt by the second application from the first application, being decrypted by the second application using second private decryption key.

10. The method according to claim 1, further comprising
deleting, using the first or second application, the first key from the first memory location.

11. A computer program product comprising a non-transitory machine-readable medium storing instructions that, when executed by at least one programmable processor, cause the at least one programmable processor to perform operations comprising:
generating, using a first application, a first key for exchange of data between the first application and a second application;
storing, using the first application, the first key in a first memory location, wherein the first memory location is accessed by the second application to obtain the first key;
generating, using the second application, a second key for exchange of data between the first application and the second application;
creating, using the second application, a data request, the data request containing the second key and being encrypted using the first key, and providing the encrypted request to the first application; and
providing, using the first application, the data identified in the data request to the second application, wherein the data is encrypted by the first application using the second key prior to being provided to the second application and the second application decrypts the data using the second key;

wherein the first application stores the encrypted data created in response to the data request in a second memory location, wherein the second memory location is created by the second application for exchanging data with the first application;

wherein the data request further comprises an identification information of the second memory location.

12. The computer program product according to claim 11, wherein the first key is a first public encryption key, wherein the first application decrypts the data request using a first private decryption key.

13. The computer program product according to claim 11, wherein the first application provides the encrypted data created in response to the data request directly to the second application.

14. The computer program product according to claim 12, wherein the operations further comprise storing, using the first application, the first public encryption key in the first memory location; and storing, using the second application, a second public encryption key in a second memory location, wherein the second memory location is accessed by the first application to obtain the second public encryption key.

15. The computer program product according to claim 14, wherein the operations further comprise creating, using the second application, a third memory location accessible by the first application and the second application;

storing, using the first application, data created in response to the data request, the data being encrypted using the second public encryption key and stored in the third memory location; obtaining, using the second application, the encrypted data from the third memory location and decrypting the obtained data using the second private decryption key; and deleting, using the second application, the third memory location.

16. The computer program product according to claim 14, wherein the operations further comprise providing, using the first application, the data created in response to the data request directly to the second application, wherein the data being encrypted by the first application using the second public encryption key and, upon receipt by the second application from the first application, being decrypted by the second application using second private decryption key.

17. A system comprising:

at least one programmable processor; and a machine-readable medium storing instructions that, when executed by the at least one programmable processor, cause the at least one programmable processor to perform operations comprising:

generating, using a first application, a first key for exchange of data between the first application and a second application;

storing, using the first application, the first key in a first memory location, wherein the first memory location is accessed by the second application to obtain the first key;

generating, using the second application, a second key for exchange of data between the first application and the second application;

creating, using the second application, a data request, the data request containing the second key and being encrypted using the first key, and providing the encrypted request to the first application; and providing, using the first application, the data identified in the data request to the second application, wherein the data is encrypted by the first application using the second key prior to being provided to the second application and the second application decrypts the data using the second key;

wherein the first application stores the encrypted data created in response to the data request in a second memory location, wherein the second memory location is created by the second application for exchanging data with the first application;

wherein the data request further comprises an identification information of the second memory location.

* * * * *